(12) United States Patent
Silverberg et al.

(10) Patent No.: US 12,509,948 B2
(45) Date of Patent: Dec. 30, 2025

(54) GEOTHERMAL SYSTEM MATERIALS

(71) Applicant: MULTISCALE SYSTEMS, INC., Worcester, MA (US)

(72) Inventors: Jesse Silverberg, Worcester, MA (US); Arthur Evans, Fresno, CA (US)

(*) Notice: Subject to any disclaimer, the term of this patent is extended or adjusted under 35 U.S.C. 154(b) by 0 days.

(21) Appl. No.: 18/277,246

(22) PCT Filed: Feb. 16, 2022

(86) PCT No.: PCT/US2022/016530
§ 371 (c)(1),
(2) Date: Aug. 15, 2023

(87) PCT Pub. No.: WO2022/177939
PCT Pub. Date: Aug. 25, 2022

(65) Prior Publication Data
US 2024/0175332 A1 May 30, 2024

Related U.S. Application Data

(60) Provisional application No. 63/149,839, filed on Feb. 16, 2021.

(51) Int. Cl.
*E21B 17/08* (2006.01)
*E21B 33/12* (2006.01)
*E21B 33/126* (2006.01)
*F16L 11/15* (2006.01)
*F16L 27/11* (2006.01)

(52) U.S. Cl.
CPC .............. *E21B 17/08* (2013.01); *F16L 11/15* (2013.01); *F16L 27/11* (2013.01); *E21B 33/1208* (2013.01); *E21B 33/1265* (2013.01)

(58) Field of Classification Search
CPC ............ E21B 17/08; F16L 11/15; F16L 27/11
See application file for complete search history.

(56) References Cited

U.S. PATENT DOCUMENTS

| | | | |
|---|---|---|---|
| 6,581,980 B1* | 6/2003 | DeLange | E21B 17/0423 285/333 |
| 2009/0139707 A1 | 6/2009 | Berzin et al. | |
| 2009/0255675 A1 | 10/2009 | Casciaro | |
| 2011/0067880 A1* | 3/2011 | Adamek | E21B 17/01 166/345 |
| 2011/0297035 A1* | 12/2011 | Langerwisch | B61F 3/14 105/1.1 |
| 2012/0073695 A1* | 3/2012 | Muth | E21B 17/22 138/177 |
| 2016/0145961 A1 | 5/2016 | Yu et al. | |
| 2017/0342797 A1 | 11/2017 | Murphree et al. | |
| 2018/0266202 A1 | 9/2018 | Pray et al. | |
| 2022/0356774 A1 | 11/2022 | Tang | |
| 2024/0068321 A1 | 2/2024 | Havlinek | |

OTHER PUBLICATIONS

International Search Report for corresponding application PCT/US2022/016530 filed Feb. 16, 2022; Mail date Jul. 5, 2022.
Written Opinion for corresponding application PCT/US2022/016530 filed Feb. 16, 2022; Mail date Jul. 5, 2022.

* cited by examiner

*Primary Examiner* — Kristyn A Hall
(74) *Attorney, Agent, or Firm* — Ruggiero McAllister & McMahon LLC; Edward L McMahon

(57) ABSTRACT

The present invention provides components with metamaterial structures for use in enhanced geothermal systems.

23 Claims, 31 Drawing Sheets

Table 1: Comparison of packer materials

| | Elastomer | 400 | 500 | 600 | 700 | 800 |
|---|---|---|---|---|---|---|
| VPR | X | ✓ | X | ✓ | ✓ | X |
| VTE | X | X | ✓ | X | X | X |
| Stress Guides | X | X | X | ✓ | X | ✓ |
| Deployable | X | ✓ | X | ✓ | ✓ | X |
| Complaints | ✓ | ✓ | ✓ | ✓ | ✓ | ✓ |
| High Temperature | X | ✓ | ✓ | ✓ | ✓ | ✓ |
| High Pressure | X | ✓ | ✓ | X | ✓ | ✓ |
| Molded and stacked | ✓ | ✓ | X | ✓ | ✓ | X |
| Additively manufactured | X | ✓ | ✓ | ✓ | ✓ | ✓ |
| Chemically resistant | X | ✓ | ✓ | ✓ | ✓ | ✓ |

FIG. 9

GEOTHERMAL SYSTEM MATERIALS

STATEMENT REGARDING FEDERALLY SPONSORED R&D

This invention was made with government support under SC0020456 awarded by United States Department of Energy. The government has certain rights in the invention.

CROSS REFERENCE TO RELATED APPLICATIONS

This application is a National Stage Entry of International Application PCT/US2022/016530 filed 16 Feb. 2022, which claims priority from U.S. provisional application 63/149,839 filed 16 Feb. 2021.

TECHNICAL FIELD

The disclosure relates to elements for downhole drilling equipment that have improved thermal tolerance, chemical corrosion resistance, and pressure tolerance.

BACKGROUND

Geothermal energy, that is energy derived from the heat originating within the Earth, is a form of energy that promises to be more sustainable and abundant than fossil fuels. It is estimated that the Earth's geothermal resources are more than adequate to supply humanity's energy needs long into the future. However, in 2019 geothermal energy contributed to only 1.8% of the renewable energy supply consumed in the United States.

Increasing energy output from geothermal plants requires access to higher temperature zones, which requires drilling to greater and greater depths. The most promising of these zones are 4 to 6 km deep with temperatures between 200 degrees to 400 degrees C. Unfortunately, today's drilling technology is poorly-suited to access systems at those temperatures. Even at shallower depths, equipment failures are frequent, creating wasted downtime while rig operators diagnose and repair failed equipment. For example, for a 3.4 km welling project budgeted for $10 million, drilling expenses of at least $2 million need to be budgeted for equipment failures, or about 44 days' worth of lost drill time. In worst-case-scenarios, rig failures force promising geothermal projects to become abandoned entirely. Deeper geothermal zones also present additional challenges to drilling equipment outside of temperature, including exposure to corrosive chemicals, for example sulfide gas and benzene-based fluids, pressures exceeding 150 MPa, disruptive vibrations, and abrasive elements.

Fully harnessing geothermal energy will require access to higher temperature zones, unlocking significantly expanded geothermal energy capacity and giving way to the broader societal, economic, and environmental benefits of a sustainable energy source.

SUMMARY

Materials of the invention include multiscale metamaterial structures that exhibit desirable strain responses to stress. Materials of the invention may exhibit anisotropic strain including even auxetic strain in response to stress and may deform in ways that help avoid material breakage or failure. For example, materials of the invention may—under conditions of extreme temperature and chemistry—respond to stress by overall elastic deformation without breakage and even absorb excessive stress and maintain an elastic response over a range of conditions that would cause failure in conventional material components and connectors. Metamaterials of the invention are useful as components in geothermal systems, to allow for drilling at greater extremes of pressure, temperature, and chemistry than with prior art materials, and without material failure and drilling project downtime.

The present invention provides materials for geothermal systems that outperform existing materials and exhibit fewer failures even at geothermal extremes of temperature, pressure, and chemistry. Materials of the invention include multiscale metamaterial structures that are designed to exhibit novel and desirable strain responses to stress. Materials of the invention may have a metamaterial internal geometry that confers properties unlike what would be found with a simple monolithic or bulk material. Due to the strain response provided by the metamaterial construction, materials of the invention can be made of materials that are otherwise more rigid than elastomers that are used in prior art devices. Materials of the invention may exhibit anisotropic strain including even auxetic strain in response to stress and may deform in ways that help avoid material breakage or failure. For example, materials of the invention may—under conditions of extreme temperature and chemistry—respond to stress by overall elastic deformation without breakage and even absorb excessive stress and maintain an elastic response over a range of conditions that would cause failure in known monolithic elastomers. Metamaterials of the invention are useful as components in geothermal systems, to allow for drilling at greater extremes of pressure, temperature, and chemistry that than with prior art materials, and without material failure and drilling project downtime. Geothermal system materials of the disclosure may find particular use within packer assemblies or casing couplings or connectors for downhole drilling equipment, whereby those components have improved thermal tolerance, chemical corrosion resistance, and pressure tolerance. Geothermal system components of the invention allow downhole drilling equipment to greatly increase the depths the equipment can access before facing mechanical failure, including allowing access to depths greater than 4 km and geothermal zones greater than 300 degrees C.

Packer assemblies, generally, provide a seal at a position along a drill hole, known as a wellbore. The seal provided by the packer assembly protects upstream drilling equipment from fluids, especially corrosive fluids, high temperatures, and high pressures. Typical packer assemblies for drilling equipment comprise a hollow cylinder, known as a mandrel, which forms a part of the tube that comprises the downhole drilling equipment. Critically, a typical packer assembly comprises a sealing element disposed around the exterior surface of the hollow cylinder of the mandrel. The sealing element of the packer assembly is tightly pressed against the wall of the wellbore, forming the seal.

Existing commercially-available packer assemblies use elastomers, i.e., materials within which the bulk mass of internal material exhibits an elastic strain response. In packer assemblies, elastomers are used to form sealing elements, because the elastomers offer large elasticity, being deformable without the threat of fracturing. For example, in a typical packer assembly, pressure can be applied to the elastomer sealing element to deform the elastomer into the walls of the wellbore, thereby creating tight contact between the sealing element and the wellbore. Exemplary existing elastomers for comparison include fluoroelastomers such as the alternating copolymer of tetrafluoroethylene and propylene sold under the trademark AFLAS by Asahi Glass Company (Tokyo) or hydrogenated nitrile butadiene rubber (HNBR). Those existing elastomers have mechanical properties that are not ideal at extremes of temperature, pressure, and chemical concentration. Corrosive geothermal conditions compromise the integrity of those existing elastomers, leading to catastrophic failure. As a result, existing elastomers in packer assemblies limit the depth of existing geothermal systems.

Casing couplings or connectors, generally, provide connections between two adjacent casing joints in a well. In some illustrative embodiments, the casing joints can be tens (e.g., 40 feet long/~12 meters long), and the couplings are threaded segments having dimensions designated by the American Petroleum Institute generally between about 6 (~15 cm) and 12 inches (~30 mm) in length. Typical casing connectors may be made of steel and have female threads in both ends for engaging to adjacent joints. Connectors of the disclosure may be made of steel, e.g., maraging steel, and may include a metamaterial structure therein. Geothermal system materials of the disclosure may find particular use within casing segment connectors for downhole drilling equipment, whereby those connectors have improved accommodation of thermal stresses. The flexible connectors of the invention allow downhole drilling equipment to greatly increase the depths the equipment can access before facing mechanical failure, including allowing access to depths greater than 4 km and geothermal zones greater than 300 degrees C. Here, the invention provides a metamaterial structure that can be used with a high strength metallic alloy such as maraging steel g300 in components of geothermal systems to offer those components thermal expansion accommodation that does not exist in prior art connectors.

Materials with greater chemical, pressure, and temperature resistances than elastomers, for example thermoplastic polymers such as polyether ether ketone (PEEK) or maraging steel, may be used in geothermal system components of the invention, even if those materials do not exhibit a bulk elasticity that matches that existing elastomers. Prior art systems may have avoided such materials due to a perception that when used in bulk, with no internal metamaterial structure, those rigid materials would not offer properties that make elastomers suitable for sealing, including elastomers being nearly incompressible, having a large extension at their break point, and requiring low pressure to set in place.

Here, the invention provides a metamaterial structure that can be used with a wide range of materials including thermoplastic polymers such as polyether ether ketone (PEEK) and maraging steel in components of geothermal systems such as packers and flexible connectors to offer those components elastic deformation properties akin to, or better than, those elastic deformation properties offered by geothermal system components made in bulk of existing elastomers such as fluoroelastomers or HNBR. Due to the disclosed metamaterial structures, geothermal system components of the invention, such as those for use in packer assemblies or casing connectors, provide improved chemical, pressure, and temperature tolerance for the drilling system. The materials in combination with the metamaterial structures imbue articles of the invention with greater chemical, pressure, and temperature resistances than offered by existing elastomers for sealing elements or other components of geothermal systems. The components can include a metamaterial structure made of a material. The material may have an elasticity lower than existing elastomers commonly used in such components, but the component itself has a stress response at least as elastic as for a similar component of similar gross dimension but made wholly from a conventional elastomer. Components such as sealing elements of the present invention are able to deform in a manner comparable to or exceeding that provided by existing elastomer components.

In certain aspects, the invention provides a component for a geothermal system. The component has a metamaterial internal structure comprising a plurality of open cells provided by internal walls of a material and open spaces. The material may be a thermoplastic polymer such as PEEK or maraging steel that, in bulk, is less elastic than an existing elastomer such as a fluoroelastomer or HNRB. However, the component itself may be more elastic than the thermoplastic polymer itself due to the metamaterial internal structure. In fact, the component itself may be at least as elastic as an existing elastomer such as a fluoroelastomer or HNRB due to the metamaterial structure despite the relative inelasticity of the material. The metamaterial structure (e.g., the particular geometry of the internal walls and the arrangement of open cells) may be designed to provide the component with an anisotropic strain response. That is, the component may preferably deform under high ambient pressure in one direction relative to at least one other orthogonal direction. Where the component is designed for use in a substantially cylindrical assembly, e.g., as a sealing element of a packer assembly, the metamaterial structure can promote radial expansion in response to axial pressure, and preferably in an anisotropic manner (i.e., due to shapes and orientations of the internal walls, the open cells preferentially fold or collapse in a manner that deforms the component outward, to create a seal within a wellbore).

The components (e.g., sealing elements or casing connectors) of the present invention achieve this deformation potential by comprising a plurality of open cells that form the metamaterial structure. Each cell within the sealing element comprises material surfaces, or walls, defining open spaces. The open cells may be present as unit cells and may be repeated adjacent one another, e.g., tessellated together in space. The open cells may be annular, extending in a ring-shaped space about an axis of the sealing element, with several such cells stacked radially and axially with respect to each other. The open cells may be unit cells that repeat angularly about the axis (as well as radially and axially). The open cells may include polygonal planes of the material and open space. In preferred embodiments, when pressure is applied axially, that is along the direction of the wellbore, to the sealing element, the plurality of repeats of an open cells promote deformation of the sealing element laterally outward from the body of the mandrel. As a result of this lateral deformation, the sealing element is pressed into the wall of the wellbore creating an initial seal. Increased stress placed on the sealing element only further causes deformation of the sealing element into the wall of the wellbore, tightening, rather than weakening, the seal. Because the sealing elements comprise materials with greater chemical, pressure, and temperature resistances than elastomers, the drilling equipment can access greatly increased depths before facing mechanical failure, including accessing depths greater than 4 km and geothermal zones greater than 300 degrees C.

Embodiments of the present invention provide a packer assembly. The packer assembly includes a mandrel comprising a hollow cylinder, a sealing element disposed around the exterior surface of the hollow cylinder of the mandrel, and a slip element movably disposed around or within the hollow cylinder mandrel. The sealing element comprises a plurality of open cells. The open cells are provided by surfaces of material defining open spaces. Each cell may be annular around an axis of the packer assembly, or the cells may be units of an annulus having rotational symmetry about the axis. The surfaces of material defining the open cells may be planar or curvilinear and may optionally have polygonal geometries. When pressure is applied axially to the sealing element, the plurality of open cells promote deformation of the sealing element laterally outward from the mandrel, e.g., to seal a wellbore. The slip element applies pressure axially to the sealing element to form a seal between the sealing element and the wall of the wellbore. The slip element can be controlled by the drill operators to initially set, or fix, the sealing element into place against the wall of the wellbore.

The intersecting walls of material of the sealing element do not need to be composed of an existing elastomer material such as fluoroelastomer or HNBR (although they could be). Instead, it is the disclosed metamaterial structure of the component that gives the components the elastic stress response. The intersecting planes of material may comprise a material with greater durability to extremes of chemical, pressure, or temperature than an elastomer. Thus, the material remains intact under extremes of, e.g., temperature and pH that would disintegrate prior elastomers. The material may itself have lower elasticity than an elastomer. The material may be PEEK or another thermoplastic polymer. However, even when comprising a material with a lower elasticity than an existing elastomer, when pressure is applied to the sealing element, the metamaterial structure, i.e., plurality of open cells, promote deformation of the sealing element laterally outward from the mandrel at a rate comparable to or greater than that of a sealing element comprising an elastomer. The open cell, metamaterial structure may provide a deformation that is auxetic in the radial direction. Importantly, a flexible casing connector (e.g., made of maraging steel and including an open cell, metamaterial structure) may be provided with an auxetic deformation profile. Additionally, when comprising a material with a lower elasticity than an elastomer, the pressure applied by the slip element axially to the sealing element to form a seal between the sealing element and the wall of the wellbore may be lower or comparable to the pressure needed to be applied by the slip element axially to a sealing element comprising an elastomer to form a seal between the elastomeric sealing element and the wall of the wellbore. In some embodiments, the sealing element comprises or is made of a thermoplastic polymer such as polyether ether ketone.

Preferably, in order to relieve pressure on the drill tooling system, when pressure is applied axially to the sealing element, the plurality of open cells may also prevent deformation of the sealing element laterally inward toward the mandrel. This is because, unlike a prior art sealing element made in bulk of an existing elastomer, the sealing element used in packers of the invention can be designed to control the direction of deformation rather than relying on deformation patterns of a bulk elastomer with no internal, metamaterial structure.

Preferably, the packer assembly of the invention comprises a sealing element that is able to retain its seal without succumbing to mechanical failure, thermal cycling fatigue, and/or failure resulting from corrosion under conditions that would damage commercially available sealing elements.

For example, the plurality of open cells of the sealing element may continue to promote deformation of the sealing element laterally outward from the mandrel without succumbing to mechanical failure, thermal cycling fatigue, and/or failure resulting from corrosion when subject to temperatures between 200 degrees C. and 400 degrees C. The open cells of the sealing element may continue to promote deformation of the sealing element laterally outward from the mandrel without succumbing to mechanical failure, thermal cycling fatigue, and/or failure resulting from corrosion at depths greater than 4 km. The metamaterial structure of the sealing element may continue to promote deformation of the sealing element laterally outward from the mandrel without succumbing to mechanical failure, thermal cycling fatigue, and/or failure resulting from corrosion when subject to pressures greater than 150 MPa.

The plurality of repeats of an open cell of the sealing element may continue to promote deformation of the sealing element laterally outward from the mandrel without succumbing to mechanical failure, thermal cycling fatigue, and/or failure resulting from corrosion when subject to exposure to fluids associated with geothermal drilling, for example hydrogen sulfide gas and benzene-based fluids.

The plurality of open cells may comprise intersecting planes or walls of multiple materials, e.g., at least a first material and a second material. Advantageously, the first material and second material may have different thermal expansion coefficients, and a plurality of repeats of an open cell decrease net thermal strain on the sealing element in comparison to a plurality of repeats of an open cell comprising a single material. For example, in some embodiments, the invention provides a component (such as a sealer element) for a geothermal system that has a metamaterial structure that includes a plurality of repeats of an open unit cell. The plurality of repeats of the open unit cell may comprise a first set of open unit cells comprising polygonal planes of the first material and open space, and a second set of open unit cells comprising polygonal planes of the second material and open space. The second set of open unit cells comprising polygonal planes of the second material and open space may be disposed within the open space of the first set of open unit cells.

The metamaterial structure cell may also comprise a lattice pattern that promotes long-wavelength deformation of the sealing element. The lattice pattern may comprise a pattern of hollow "pores" disposed within the material, thereby forming planes of the material and open space.

The metamaterial structure may also promote anisotropic specific energy absorption for the sealing element. The advantage of a sealing element comprising a plurality of open cells that promote anisotropic specific energy absorption for the sealing element, is that the sealing element can be collapsed from an unfolded configuration to a folded configuration when pressure is applied along the lower-specific energy plane of the sealing element promoted by the plurality of open unit cells. This can facilitate transport of the sealing element to a drill site or downhole. Moreover, expansion of the sealing element facilitated by the anisotropic specific energy promoted by the plurality of open cells may aide in setting the sealing element at the point that the seal is needed, with or without the use of a slip. Importantly, despite a lower specific-energy plane existing within the sealing element, when pressure is applied axially to the sealing element, that is to say in the direction of a higher specific-energy plane than the lower-specific energy plane, the plurality of open cells promote deformation of the sealing element laterally outward from the mandrel.

In an aspect of the invention, the plurality of repeats of an open cell minimize or terminate fracture paths within the sealing element upon first exhibiting mechanical failure. For example, the curve of intersecting polygonal planes of an open unit cells of the plurality of open cells concentrate stress in particular areas of curvature to minimize fracture paths.

The present invention also provides a sealing element comprising an open (or "pipe-like") cylinder comprising a plurality of repeats of an open cell, each cell comprising walls of material defining open spaces therein. The walls maybe polygonal or have curvilinear edges. The walls may be planar or bowed. When pressure is applied axially to the sealing element, the plurality of open cells promote deformation of the sealing element outward from the radius of the cylinder.

The intersecting walls of material advantageously do not require that the material be an elastomer. Rather, the intersecting walls of material may comprise a material with lower elasticity than an elastomer (or not). However, when pressure is applied axially to the sealing element, the plurality of open cells promote deformation of the sealing element laterally outward from the center of the cylinder to an extent greater than that of a sealing element comprising an elastomer. The sealing element may comprise a polyether ether ketone. When pressure is applied axially to the sealing element, the plurality of open cells may also prevent deformation of the sealing element laterally inward toward the center of the hollow cylinder.

Advantageously, when pressure is applied axially to the sealing element, the plurality of open cells promote deformation of the sealing element laterally outward from the center of the hollow cylinder without exhibiting mechanical failure at a depth of greater than 4 km, a temperature greater than 175 degrees C., pressure greater than 75 MPa, and/or when exposed to geothermal chemicals corrosive to elastomers.

The plurality of open cells of the sealing element may comprise intersecting polygonal planes of material comprising a first material and a second material. Advantageously, the first material and second material have different thermal expansion coefficients, and wherein the plurality of open cells decrease net thermal strain on the sealing element in comparison to a plurality of open cells comprising a single material. For example, the plurality of open cells may comprise a first set of open unit cells comprising polygonal planes of the first material and open space and a second set of open unit cells comprising polygonal planes of the second material and open space. The second set of open unit cells may be disposed within the open space of the first set of open unit cells.

The sealing element may comprise a plurality of open cells comprising a lattice pattern that promotes long-wavelength deformation of the sealing element.

The sealing element may comprise a plurality of repeats of an open unit cell that promote anisotropic specific energy absorption for the sealing element. The sealing element can be collapsed from an unfolded configuration to a folded configuration when pressure is applied along the lower-specific energy plane of the sealing element promoted by the plurality of open unit cells.

In an aspect of the invention, the plurality of open cells minimize fracture paths within the sealing element upon first exhibiting mechanical failure. For example, the intersecting walls or polygonal planes of an open cell terminate fracture paths.

In certain aspects, the invention provides a casing connector for a geothermal well. The connector includes a hollow cylindrical body with upper and lower ends and a bellows disposed within the body. Preferably, an upper end of the bellows has an upper mating face for coupling to a first casing, and a lower end of the bellows is connected to the lower end of the body, where the lower end of the body includes a lower mating face. An external surface of the body may be substantially smooth and cylindrical.

The bellows have a form defined by at least two sets of non-parallel corrugations. For example, the bellows may include an undulating surface defined by intersections or interferences among two or more sets of corrugations.

The bellows may be connected to the body at the lower end. In preferred embodiments, the bellows and the body are of one monolithic piece of material. The connector may be made by a powder bed fusion (PDF) process. Preferably the connector is made from steel (e.g., stainless steel 316L or g300 maraging steel formed into the connector by additive manufacturing) In some embodiments, the connector includes at least one torque shoulder, wherein at least one face of the torque shoulder is ramped and does not present an overhang during additive manufacturing.

Preferably, both ends of the connector include mating faces, each either smooth or threaded. For example, either or both ends may include additively manufactured threads. The bellows add lightness. Preferably a mass of the connector is less than about 4.2 kg.

The bellows may include additively manufactured steel in a multi-corrugated form, whereby the connector can accommodate up to 5% axial strain before yield and greater than 10% axial strain before failure. The bellows may have at least two sets of non-parallel undulations that meet or cooperate to define open cells along a surface of the bellows. When pressure is applied axially to the connector, open cells along a surface of the bellows may promote deformation of the connector axially to an extent greater than that of a connector made with a bulk monolithic structure and no open cells.

Aspects of the disclosure provide a component for a geothermal system where the component is made with materials of the disclosure and may, in particular, be a casing segment connector for downhole drilling equipment, whereby those connectors have improved accommodation of thermal stresses. The flexible connectors of the invention allow downhole drilling equipment to greatly increase the depths the equipment can access before facing mechanical failure, including allowing access to depths greater than 4 km and geothermal zones greater than 300 degrees C. Here, the invention provides a metamaterial structure that can be used with a high strength metallic alloy such as maraging steel g300 in components of geothermal systems to offer those components thermal expansion accommodation that does not exist in prior art connectors. Embodiments provide a connector component for connecting segments of tubing used in wells drilled into high temperature, high pressure, and highly corrosive environments. The connector component includes a hollow cylindrical body in which an internal, substantially cylindrical volume of the body has a metamaterial structure. The metamaterial structure includes a plurality of cylindrically repeated cells. The cylindrical body may further include threaded surfaces at either upper and/or lower ends of the body to attach to a joint or another casing. Preferably, the body has walls comprising a high strength corrosion-resistant metallic alloy. The material of the walls may be a high strength corrosion-resistant metallic alloy or thermoplastic.

BRIEF DESCRIPTION OF THE DRAWINGS

FIG. 9 gives Table 1, a comparison of the properties sealing elements.

DETAILED DESCRIPTION

The present invention provides components for use in geothermal systems including, for example, packer assemblies for downhole drilling equipment. Geothermal system components of the invention have improved thermal tolerance, chemical corrosion resistance, and pressure tolerance. Components such as packer assemblies of the invention allow downhole drilling equipment to greatly increase the depths the equipment can access before facing mechanical failure, including allowing access to depths greater than 4 km and geothermal zones greater than 300 degrees C.

Figure 1:
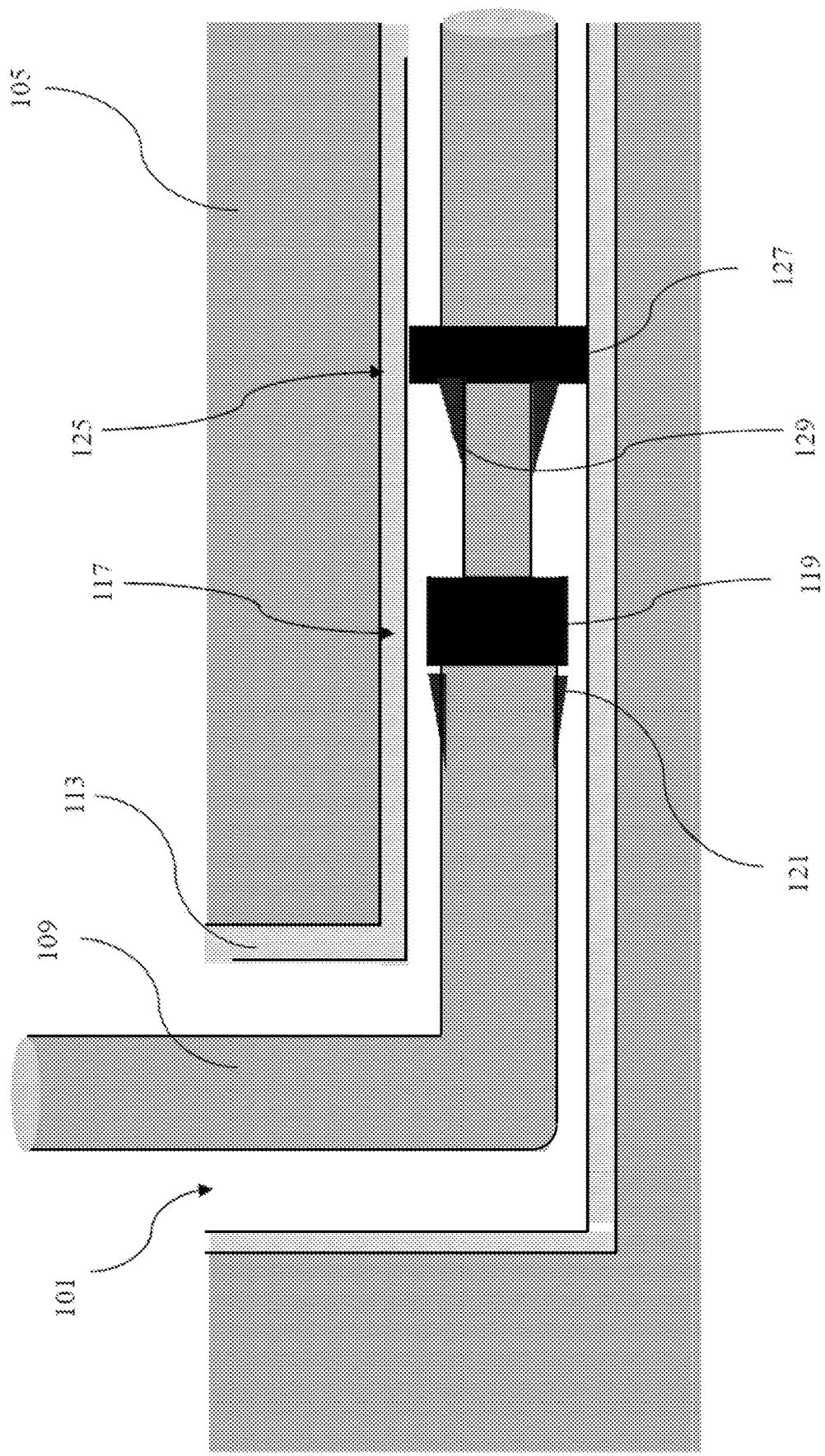
FIG. 1 depicts a wellbore and a packer assembly consistent with the invention.

FIG. 1 depicts a wellbore and a packer assembly consistent with the invention. The drill hole, or wellbore 101, has been drilled to a given depth in the ground 105 and the tube 109 of the geothermal drilling equipment is in place. An undeployed packer assembly 117 is at a chosen location in the wellbore 101 and disposed along the tube 109 of the drilling equipment. The system deploys a slip 121, which has not been used to set the sealing element 119 in place, that is in contact with the wall, or casing 113, of the wellbore 101. A deployed packer assembly 125 is shown. The slip 129 is used to set the sealing element 127 is place. In this system the slip 129 moves axially along the down-hole direction of the tube of the drilling equipment 109 to apply pressure axially to the sealing element 127. The sealing element 127 deforms outward from the tube of the drilling equipment 109 to form a seal with the wall of the wellbore 109. The wall of the wellbore 109 depicted is cased. A casing provides the advantage of strengthening the walls of the wellbore. For example, a cement may be introduced to the wellbore to form a casing that strengthens the walls of the wellbore. In aspects of the invention in which the wellbore comprises a casing, the sealing element forms a seal with the casing of the wellbore. An openhole or naked wellbore means a wellbore that does not have a casing. Packer assemblies are discussed in U.S. Pat. No. 10,060,217, incorporated by reference.

The seal provided by the packer assembly of the present invention protects upstream drilling equipment from fluids, especially corrosive fluids, high temperatures, and high pressures. The packer assembly may comprise a mandrel comprising a hollow cylinder, a sealing element disposed around the exterior surface of the hollow cylinder of the mandrel, and a slip element movable disposed around or within the hollow cylinder mandrel.

The mandrel may form a part of the tube that comprises the downhole drilling equipment. The mandrel may generally have a smaller radius than the majority of the downhole drilling equipment. This allows for the packer assembly, when the packer assembly is not set in place, to be easily transportable down the wellbore.

The sealing element may include one of the geothermal system materials of the present invention. The geothermal system materials of the present invention may be used in components of geothermal systems including, for example, in a component of a packer assembly such as a sealing element. Preferably, components of the present invention comprise a metamaterial structure made up of a plurality of open cells. Each cell within the component (e.g., within a sealing element) comprises material surfaces defining open spaces. The open cells may be present as unit cells and may be repeated adjacent one another, e.g., tessellated together in space. The open cells may be annular, extending in a ring-shaped space about an axis of the sealing element, with several such cells stacked radially and axially with respect to each other. The open cells may be unit cells that repeat angularly about the axis (as well as radially and axially). Angular repetition describes similar pieces that intersect a common plane and exhibit rotational symmetry with one another (like slices of a pie). Radial repetition describes a series of similar concentric rings, one outside of the next, all substantially intersecting a common plane. Axial repetition generally describes similar concentric rings of similar diameter that are repeated in a stack to form a tube (like a stack of tires). Within metamaterials of the invention, angular, radial, and axial repetition are not exclusive categories but are instead akin to vectors of a coordinate system. For example, a first unit cell may be a repeat of a second unit cell albeit offset in both an axial and radial direction.

In some embodiments, a sealing element comprises a plurality of repeats of an open cell, each cell comprising walls (planar or bowed) of material defining open spaces. Each cell within the component may be an exact geometric repeat of its neighbors, or the geometry of each cell may change in a formulaic manner. For example, as the cells progress radially from an axis of a wellbore, those cells may exhibit a progressive transformation, e.g., by being geometrically compressed or extended in a radial direction relative to an axial or angular direction.

When pressure is applied axially to the sealing element, the plurality of open cells promote deformation of the sealing element laterally outward from the mandrel. A slip element may apply pressure axially to the sealing element to form a seal between the sealing element and the wall of the wellbore.

Setting the sealing element means setting the packer assembly. The slip element may be any known slip element for "setting" a sealing element. For example, the slip element may rotate axially towards the sealing element to set the packer assembly. The slip element may respond to fluid pressure to set the packer assembly. The slip element may comprise a cone-shape, or may comprise a cone-shaped element, which allows the slip element to apply pressure at a set point on the sealing element to set the packer assembly.

The packer assembly may not comprise a slip. The sealing element may be set by fluid pressure. The sealing element may be set by rotation of the mandrel. The sealing element may be permanently set.

Advantageously, when pressure is applied axially to the sealing element, the plurality of open cells promote deformation of the sealing element laterally outward without exhibiting mechanical failure, thermal cycling fatigue, and/or failure resulting from corrosion at a depth of greater than 4 km, a temperature greater than 175 degrees C., pressure greater than 75 MPa, and/or when exposed to geothermal chemicals corrosive to elastomers.

Mechanical failure means failure that manifests as tubular twisting, ballooning, or pipe collapse to a degree that a component does not perform its intended function.

Thermal cycling fatigue means fatigue related to heat transfer. Thermal cycling can exacerbate fracture conditions. Thermal cycling fatigue is frequently caused by large temperatures swings. Thermal cycling fatigue is common in the cement casings of cased wellbores. Prior art elastomeric components in some situations have been known to lose their sealing capabilities when subject to thermal cycling fatigue.

Corrosion failure means failure due to a number of challenging fluid chemistries, including high dissolved gas content composed of constituents like carbon dioxide, hydrogen sulfide, and methane. Corrosive chemistries are responsible for a substantial decrease in the volumetric swelling, compression, and hardness properties of conventional sealing elastomers. Additionally, the total dissolved solids metrics for high temperature and high pressure wellbores are often very large.

A feature of the invention is that a component as a metamaterial structure within which walls of the cell are made of a material that need not be an elastomer such as a fluoroelastomer or HNRB. For example, the component may be a sealing element that comprises a thermoplastic polymer, for example a polyether ether ketone. The polyether ether ketone may be an unfilled (i.e. neat) polyether ether ketone. The polyether ether ketone may be a filled polyether ether ketone, for example a glass-fiber reinforced polyether ether ketone.

Figure 2:
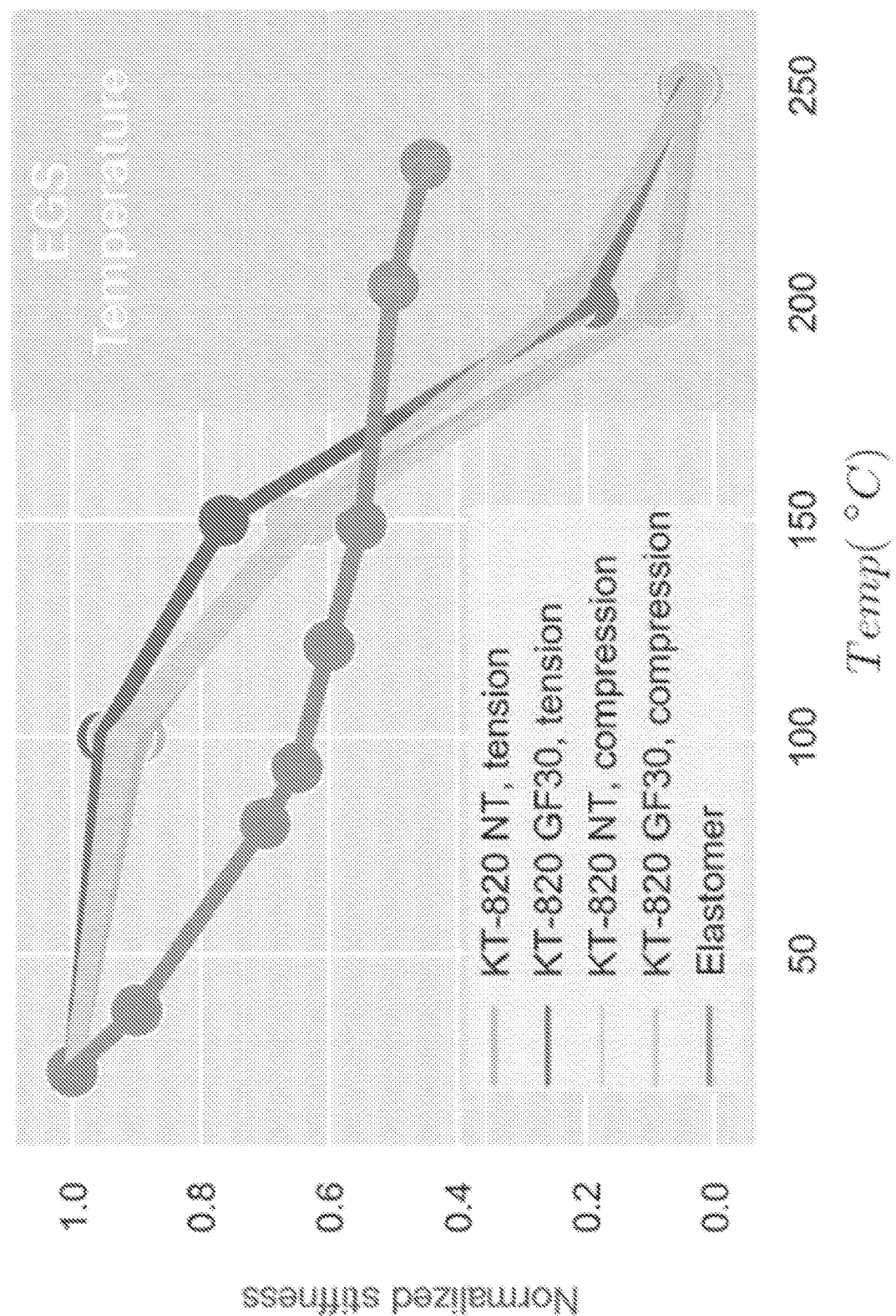
FIG. 2 is a graph showing the stiffness properties of polyether polymers and elastomers.

FIG. 2 depicts a graph showing the stiffness properties of various polyether polymers and an elastomer. Specifically, the graph shows the stiffness properties of the polyether ether ketone sold under the trade name KETASPIRE ("KT-820") as both unfilled (i.e. "neat" or "NT") and glass fiber reinforced ("GF30") varieties by Solvay S.A. (Brussels, BE). Although a disadvantage of polyether polymers is the high room-temperature stiffness, at temperatures greater than about 170 degrees the stiffness of polyether polymers drops dramatically. The present invention may be used to create sealing elements using polyether polymers with even further reduced stiffness without sacrificing strength.

Figure 3:
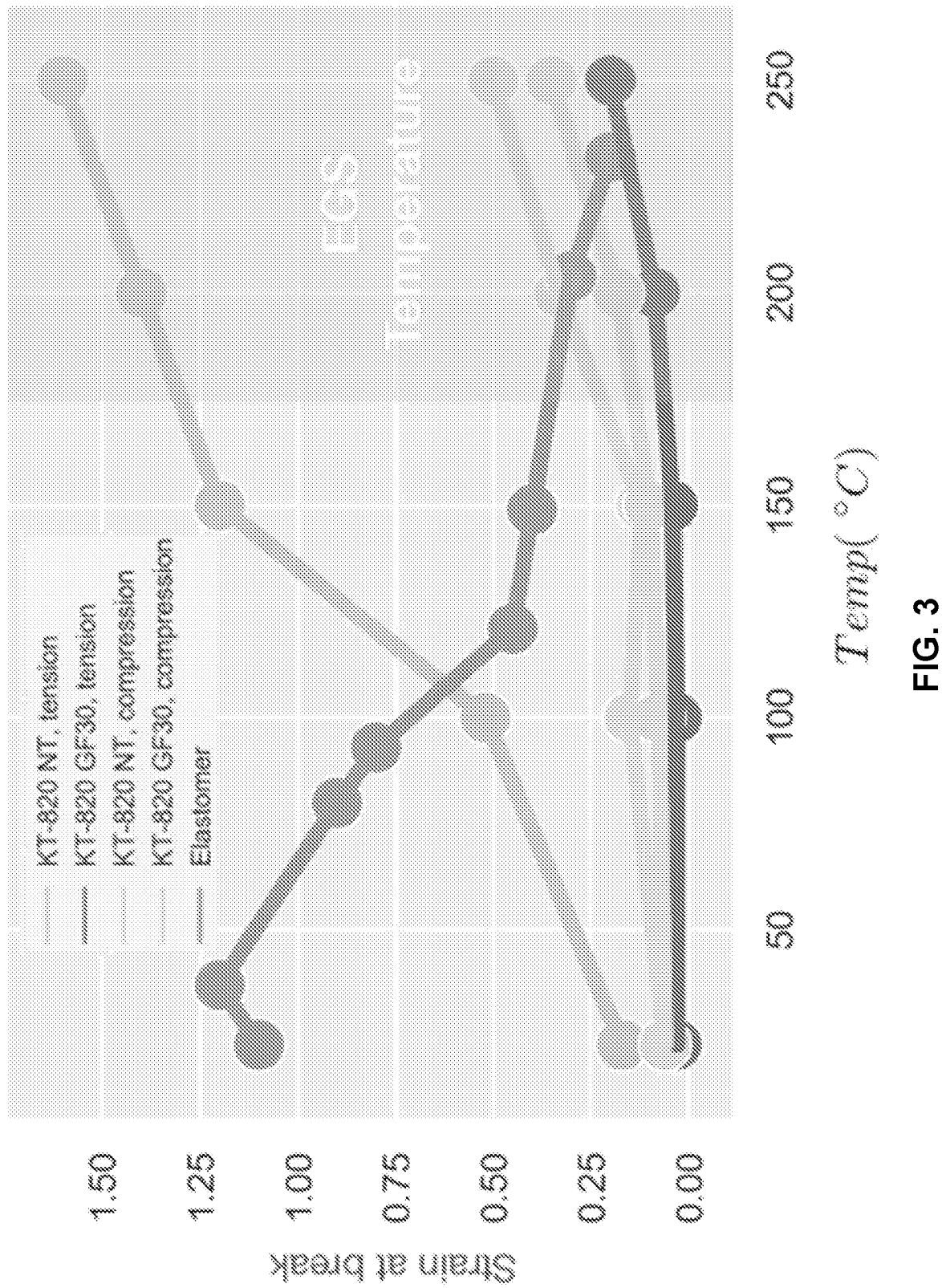
FIG. 3 is a graph showing the break properties of polyether polymers and elastomers.

FIG. 3 depicts a graph showing the strain and break properties of unfilled polyether polymers, filled polyether polymers, and elastomers. At low temperatures, elastomers have a large elastic recoverability, whereas polyether polymers are brittle. At temperatures greater than about 170 degrees elastomers become brittle and polyether polymers become ductile. In fact, neat polyether polymers achieve tensile ductility that exceeds the limits of testing facilities, with break points exceeding elastomers.

Advantageously, polyether ether ketone is corrosion resistant. Polyether ether ketone also advantageously becomes more compliant under higher temperatures, including temperatures greater than 170 degrees C. In addition, in contrast with elastomers, polyether ether ketones become more ductile under higher temperatures, including temperatures greater than 170 degrees C., and may achieve larger deformations than elastomers at elevated temperatures.

The present invention can be used to create sealing elements using polyether polymers that reduce axial pressure that is needed to set the sealing element.

Figure 4:
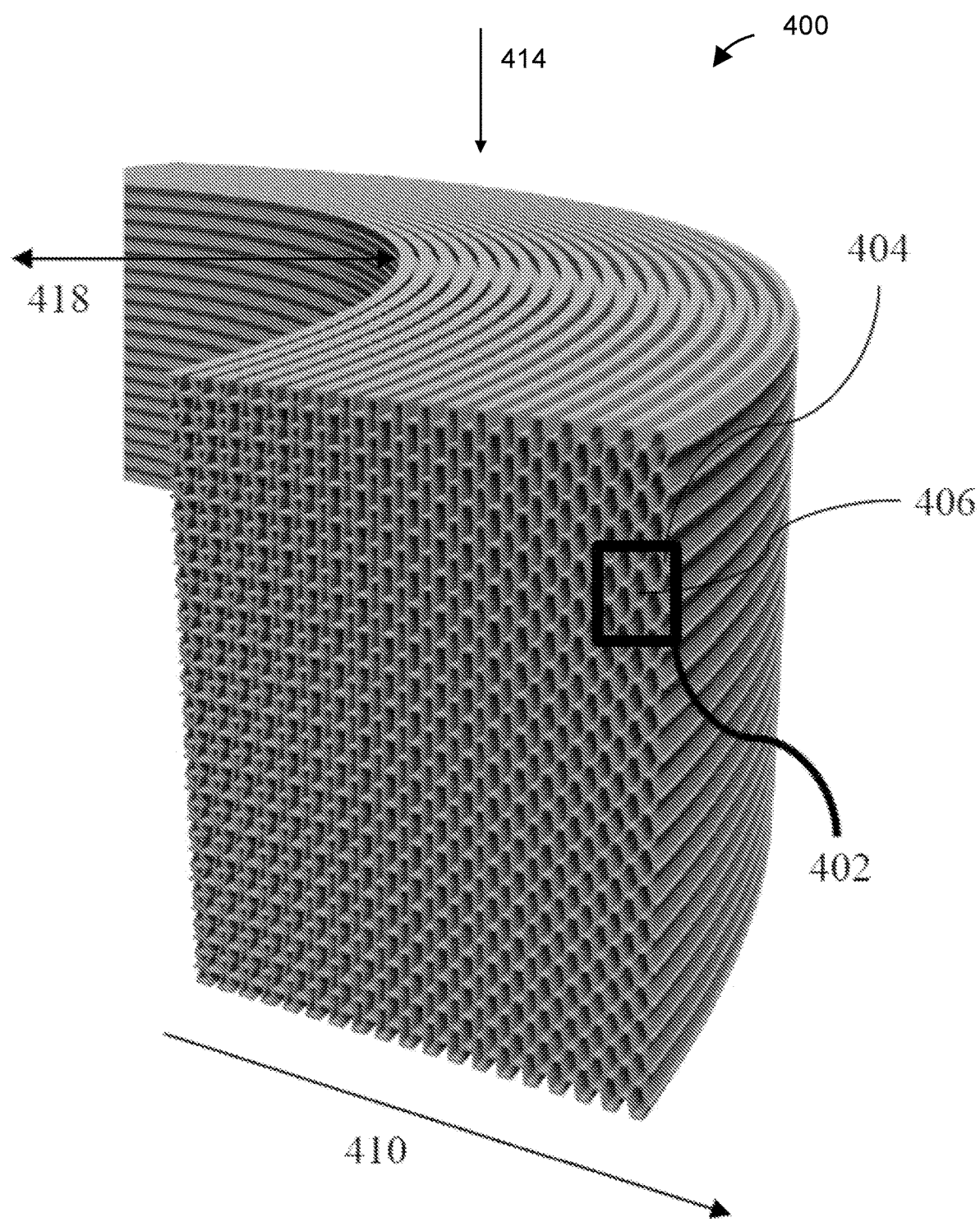
FIG. 4 depicts an aspect of the sealing element of the invention.

FIG. 4 depicts an auxetic embodiment of a sealing element 400 comprising a plurality of open cells. The sealing element 400 comprises a plurality of open cells 402, each open cell comprising walls of the material 404 and open space 406. When axial pressure 414 is applied axially, that is along the direction of the wellbore, to the sealing element 400, the open cells 402 promote deformation of the sealing element 400 laterally outward 410 from the axis and from body of the mandrel (not pictured). As a result of this lateral deformation 410, the sealing element is pressed into the wall of the wellbore (not pictured) creating a seal. Advantageously, the internal radius 418 of the sealing element 400 neither expands nor contracts while the outer radius deforms outwardly 410. The sealing element 400 has a high strength-to-weight ratio and is relatively compliant when constructed out of thermoplastic polymers.

The cells 402 generate a radially variable Poisson effect, so that when the tubular element is compressed or tensioned the internal radius neither expands nor contracts, but the sealing surface is still available to expand regularly. Poisson's ratio is a measure of the Poisson effect, the deformation (expansion or contraction) of a material in directions perpendicular to the direction of loading. The value of Poisson's ratio is the negative of the ratio of transverse strain to axial strain. For small values of these changes, Poisson's ratio is the amount of elongation divided by the amount of compression, where compression is orthogonal to elongation. Most materials have Poisson's ratio values ranging between 0.0 and 0.5. Soft materials, such as rubber, where the bulk modulus is much higher than the shear modulus, Poisson's ratio is near 0.5. In the auxetic embodiments, the VPR is tuned so that the component preferably expands in either compression or tension, so that it may be customized to a particular mechanically-set packer system. The VPR effect is achieved by varying the unit cell geometry, which is based on a honeycomb, but implemented in a cylindrically symmetric fashion. It is a cellular solid that has a high strength-to-weight ratio, and is relatively compliant when constructed out of a high stiffness thermoplastic because of the thin-walled construction.

Figure 5:
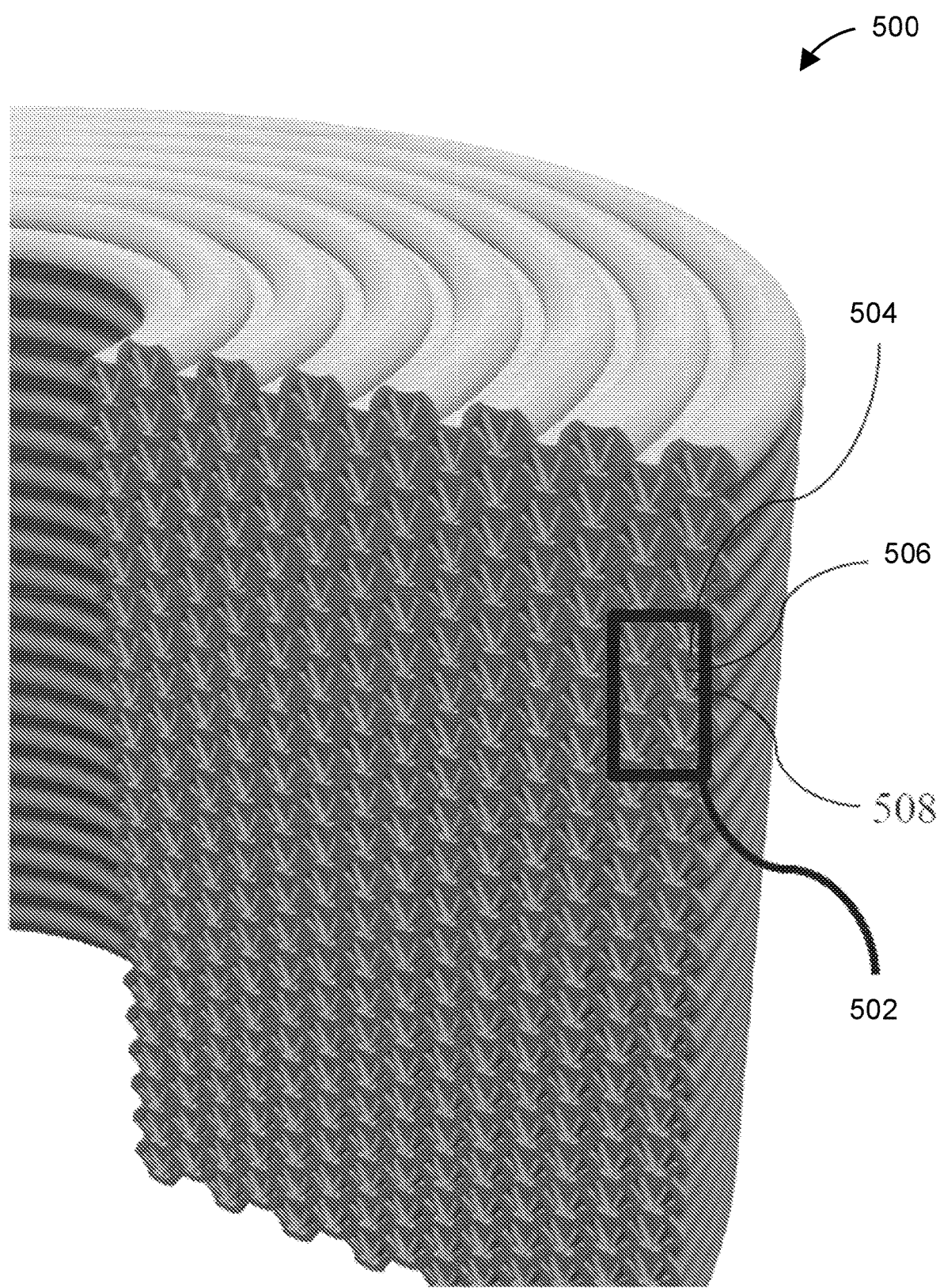
FIG. 5 depicts an aspect of the sealing element of the invention comprising two materials.

FIG. 5 depicts variable thermal expansion (VTE) embodiment of the sealing element 500 of the invention comprising two materials. The plurality of repeats of an open cell 502 may comprise intersecting polygonal planes of material comprising a first material 504 and a second material 508. Advantageously, the first material 504 and second material 508 may have different thermal expansion coefficients, and the plurality of repeats of an open cell decrease net thermal strain on the sealing element 500 in comparison to a plurality of repeats of an open cell comprising a single material. For example, the plurality of repeats of an open cell may comprise a first set of open unit cells comprising polygonal planes of the first material 504 and open space 506, and a second set of open unit cells comprising polygonal planes of the second material 508 and open space. The second set of open unit cells comprising polygonal planes of the second material 508 and open space may be disposed within the open space 506 of the first set of open unit cells.

Layering two or more materials with disparate thermal expansion coefficients can produce "ultralow" thermal expansion in the sealing element and/or variable/anisotropic thermal expansion. Significantly, including materials with disparate thermal expansion coefficients provides for variable thermal expansion (VTE), or—stated differently—the multi-material embodiment 500 of a metamaterial may exhibit an anisotropic expanding force in response to changing heat. When the sealing element 500 is brought to an extreme of heat, the element 500 exerts a force to expand positively or negatively differently along radial and axial directions. Materials may be combined with advanced geometries to further influence the thermal expansion of the sealing element.

Figure 6:
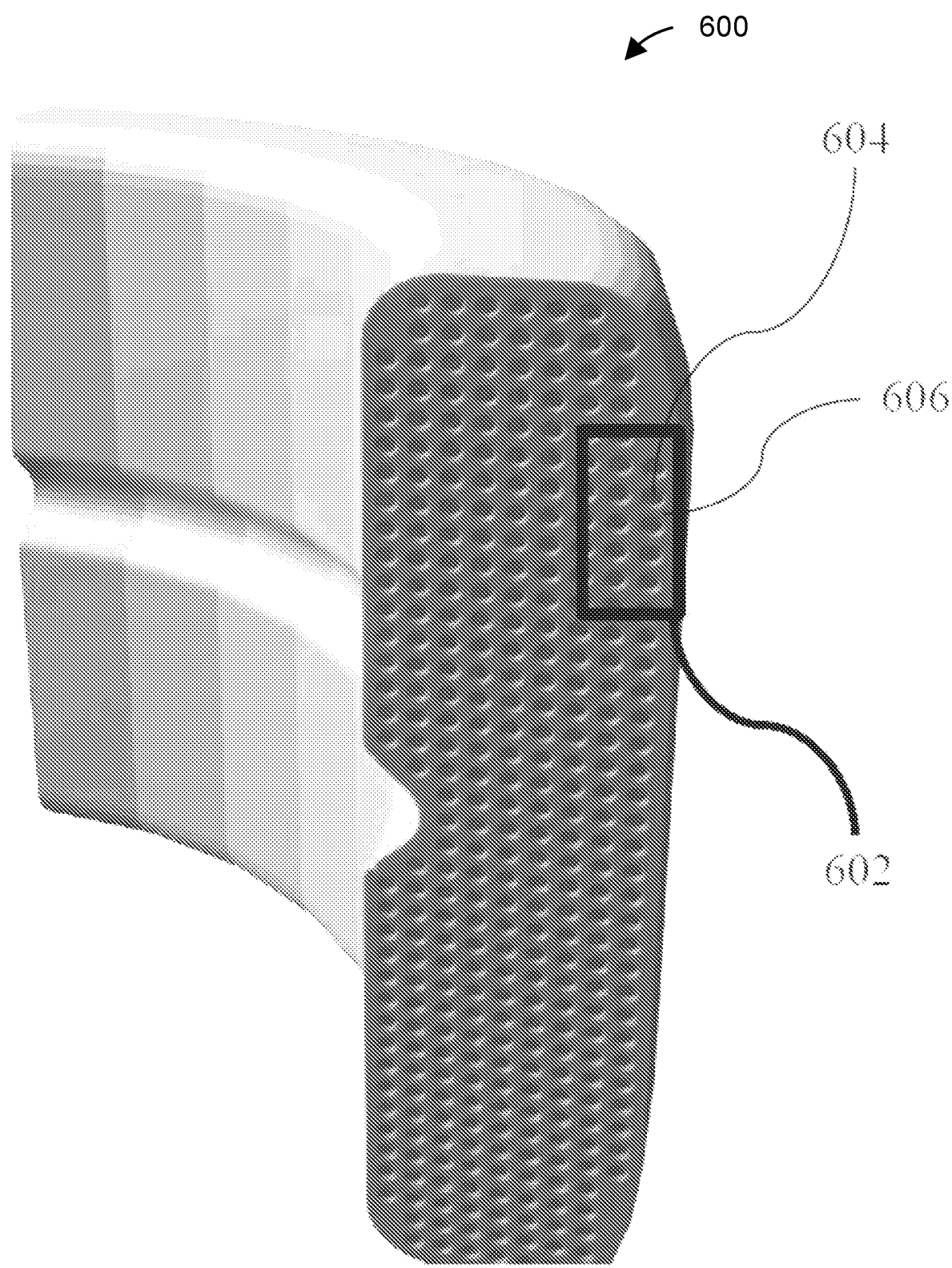
FIG. 6 depicts an aspect of the sealing element of the invention comprising a lattice.

FIG. 6 depicts a smart-buckling embodiment 600 of a sealing element of the invention comprising a lattice. The plurality of open cells 602 comprise a lattice pattern that promotes long-wavelength deformation of the sealing element 600. The lattice pattern may comprise a pattern of hollow "pores" 604 disposed within the material, thereby forming planes of the material 606 and open space 604. Pores 604 disposed with the material to form the plurality of open unit cells provides the advantage of softening the sealing element 600 to enable advantageous buckling and compliance for the sealing element 600. As a result, the fatigue life of the sealing element can be increased, or the manner of break controlled.

Figure 7:
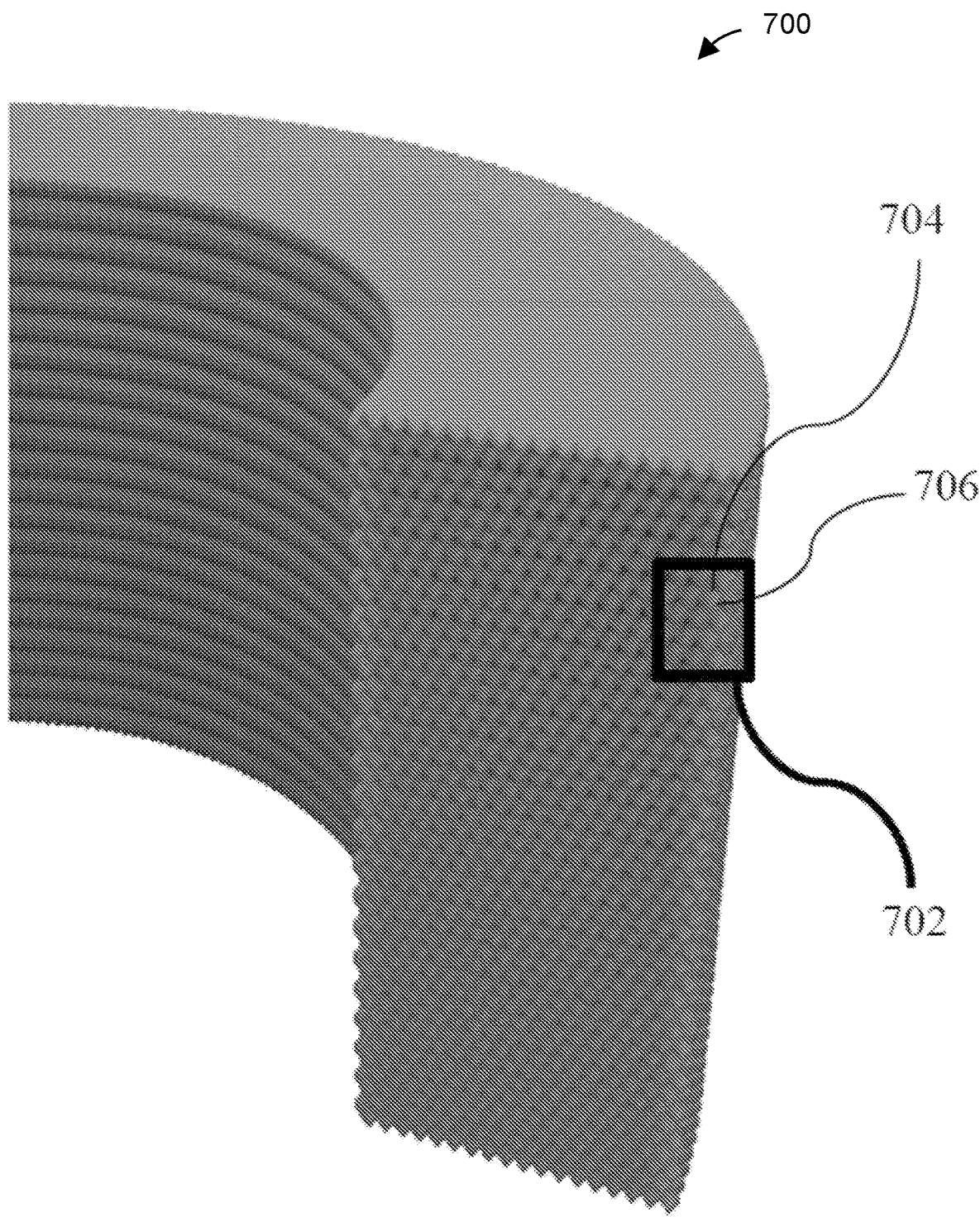
FIG. 7 depicts a sealing element of the invention having anisotropic properties.

FIG. 7 depicts diamond-profile embodiment of the sealing element 700 of the invention having anisotropic properties. The sealing element 700 comprises a plurality of repeats 702 of an open unit cell, each unit cell comprising polygonal planes of the material 704 and open space 706. The sealing element 700 can incorporate a lattice pattern and may comprise a pattern of hollow pores 704, herein diamond-shaped pores 704, disposed within the material, thereby forming planes of the material 706 and open space 704. The advantage of a sealing element comprising a plurality of open cells 702 that promote anisotropic specific energy absorption for the sealing element, is that the sealing element can be collapsed from an unfolded configuration to a folded configuration when pressure is applied along the lower-specific energy plane of the sealing element promoted by the plurality of open unit cells 702. The diamond profile embodiment is preferred for the greatest diversity of wellbore sizes, i.e., where temperature, chemistry, or tectonics are not extreme, but a plurality of one-size-fits-all sealing elements should be on-hand, the diamond-profile embodiments 700 may be preferred.

A structure having anisotropic properties is a structure in which the property when measured from different directions has different values. A structure having isotropic properties is a structure in which the property when measured from different directions has the same value. Specific energy absorption means the amount of energy absorbed per unit mass for a material, structure, or component.

Figure 8:
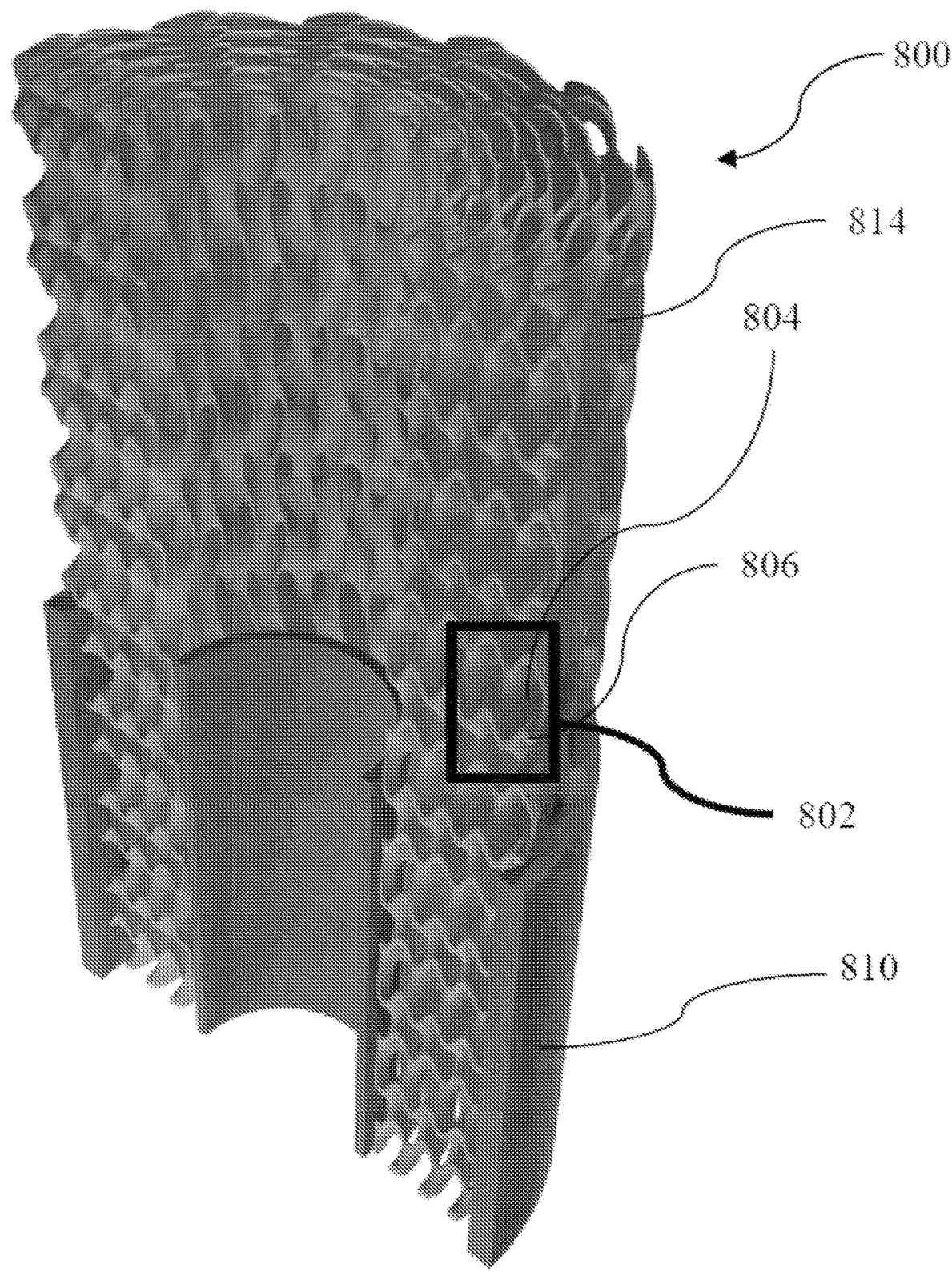
FIG. 8 depicts a sealing element of the invention designed to minimize fracture paths.

FIG. 8 depicts a crease-free embodiment of a sealing element 800 of the invention designed to minimize fracture paths. The sealing element 800 comprises a plurality of repeats 802 of an open unit cell, each unit cell comprising curved walls of the material 804 and open space 806. The wellbore wall is comprising a casing 810 is also shown. The sealing element 800 is designed to minimize fracture paths that nucleate within a sealing element 800. The curved shape of the outer surface 814 is used to control and mitigate the severity of fractures. Moreover, the curved or bowed walls are designed to concentrate stress in particular areas of curvature to prevent fractures from spreading through the entire sealing element, delaying the onset of catastrophic failure. In the crease-free embodiment, there are now straight lines that would present when planar walls intersect. It may be theorized that such lines present a form of "stress riser", sometimes called a stress raiser, at which a fracture or failure may originate. It will be appreciated that different embodiments may each have their own value in being matched to various real-world conditions. For example, a crease-free embodiment may be preferred in tectonically active areas of the globe as seismic activity may introduce the type of shocks that initiate failures at stress risers. Accordingly, for drilling at the Pacific rim, for example, the crease-free embodiments may be preferred.

FIG. 9 gives Table 1, a comparison of the properties sealing elements: including commercially available elastomer-based sealing elements (I); the auxetic embodiment 400 according to the invention comprising a plurality of open cells, each cell comprising walls of material and open space (II); the variable thermal expansion (VTE) embodiment 500 according to the invention comprising two materials (III); the smart-buckling embodiment 600 comprising a lattice of pores (IV); the diamond-profile embodiment 700 having anisotropic properties (V); and the crease-free embodiment 800, designed to minimize stress risers and fracture paths.

Elastomeric packer assemblies of the prior art have included a sealing element composed of a solid ring or collar made in bulk elastomer that degrades above 150 degrees, fails catastrophically in the presence of highly corrosive solvents, and cannot hold the required pressure differential to maintain a seal. Elastomers provide the advantage of being very compliant, requiring a small setting force to set the sealing element, and can be molded and deployed in a stacked array of multiple packers. Elastomer sealing elements, however, cannot be used to control stress fractures that arise, are difficult to deploy, and cannot be additively manufactured.

The sealing elements of the invention provide high temperature, high pressure, and chemical resistance, in aspects of the invention derived from use of material other than elastomers. Additionally, the sealing elements of the invention can each be additively manufactured, for example by 3D printing, and their design provides them the advantage of being highly compliant.

The auxetic embodiment 400 according to the invention provides the advantages of being highly compliant. The sealing element 400 can also be deployed in a stacked array of multiple packers. Due to the metamaterial geometry, the sealing element 400 may be found to maximize the potential auxetic strain response to stress, providing an outward radial force in response to axial compression. The embodiment may be used to seal wellbores between stable but diverse strata such as within a limestone cap over a porous sandstone stratum.

The variable thermal expansion (VTE) embodiment 500 may provide advantages of having a lower or anisotropic thermal expansion coefficient. The VTE component 500 exhibits expansion that is controlled by temperature including possibly negative expansion.

The smart-buckling embodiment 600 according to the invention comprising a lattice of pores provides the advantage of being easily deployed. The fracture paths that nucleate from this sealing element 600 can be controlled.

The diamond-profile embodiment 700 according to the invention having anisotropic properties provides the advantage of being the easiest to deploy in comparison with other sealing elements of the invention and advantageous when deployed as a stacked array of multiple packers. A sealing element of the diamond profile embodiment has the greatest flexibility, or general-purpose utility, in terms of boreholes and spaces for deployment.

The crease-free embodiment 800 according to the invention includes components designed to minimize fracture paths and provides the advantage of best controlling the fracture paths that nucleate from the sealing element 800. Components such as sealing elements according to the crease-free embodiments are easily manufactured using an additive manufacturing method.

Figure 10:
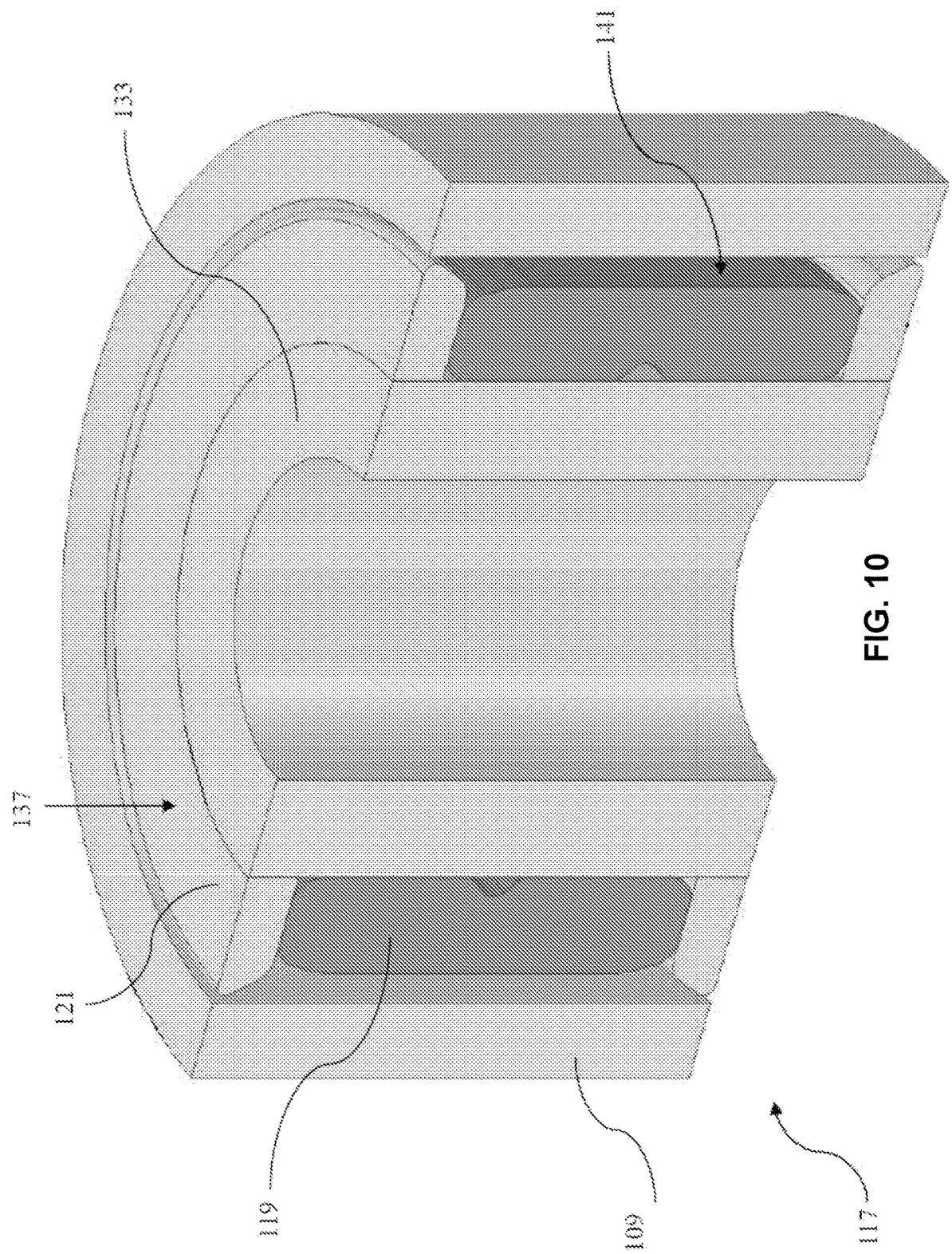
FIG. 10 depicts a packer assembly consistent with the invention.

FIG. 10 depicts a packer assembly 117 of embodiments of the invention. The mandrel 133 is present comprising a hollow cylinder. The sealing element 119 is disposed around the exterior surface of the hollow cylinder of the mandrel 133. A slip 121 comprising an upper drive ring is movably disposed around the hollow cylinder of the mandrel 133. The slip 121 is pressed axially 137 against sealing element 119, thereby applying pressure axially 137 to the sealing element 119 to form a seal between the sealing element and the wall of the wellbore 109, here shown with a casing. The packer assembly 117 shown is not set, as depicted by the space 141 between the sealing element 119 and the wall of the wellbore. The mandrel 133 is preferably a hollow cylinder and the mandrel 133 and/or the wall (which may be a casing) may be composed of a metal or metal alloy, for example a steel alloy.

Figure 11:
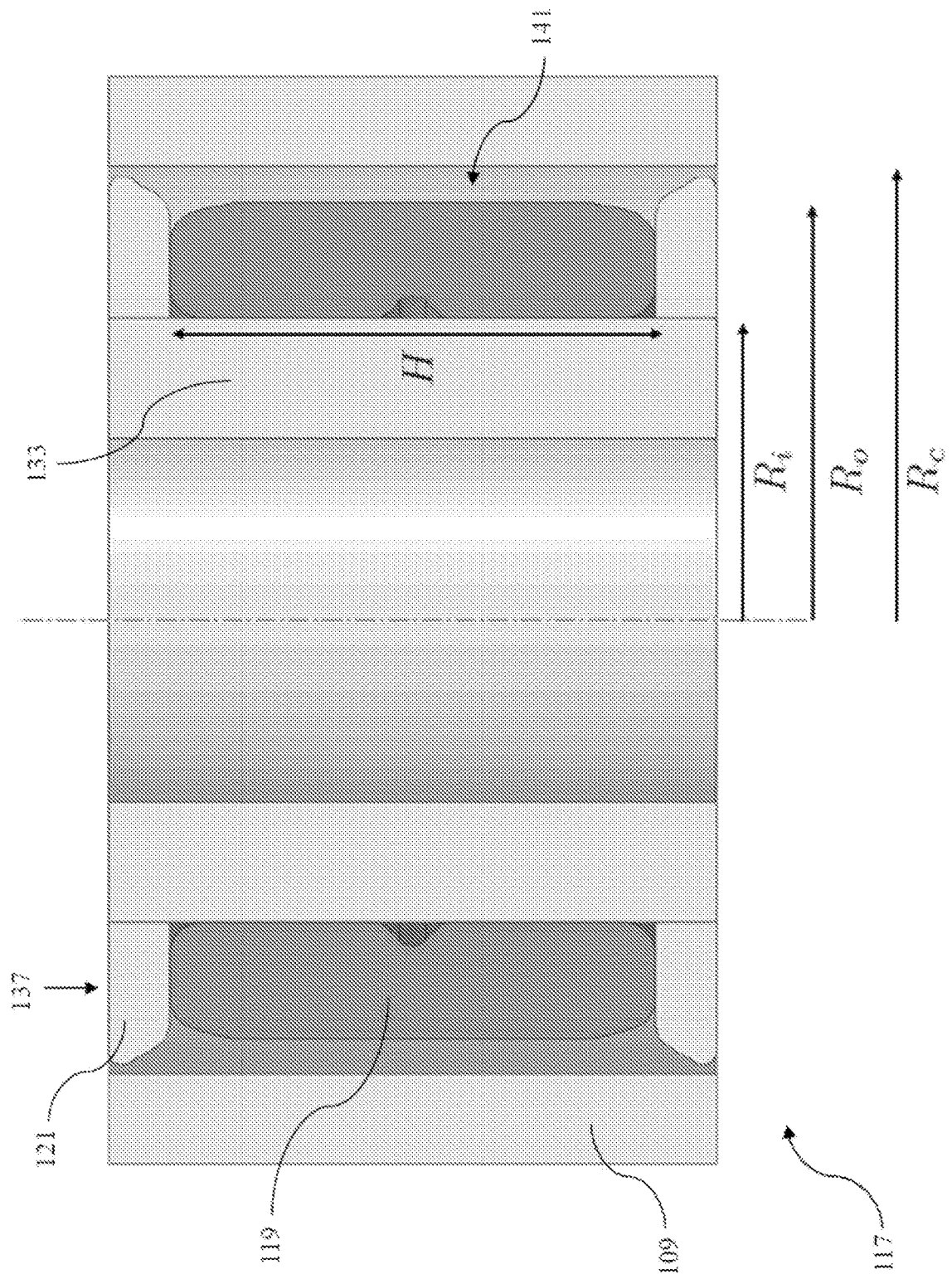
FIG. 11 depicts a cross-section of a packer assembly consistent with the invention.

FIG. 11 depicts a cross-section of a packer assembly consistent with the invention.

Figure 12:
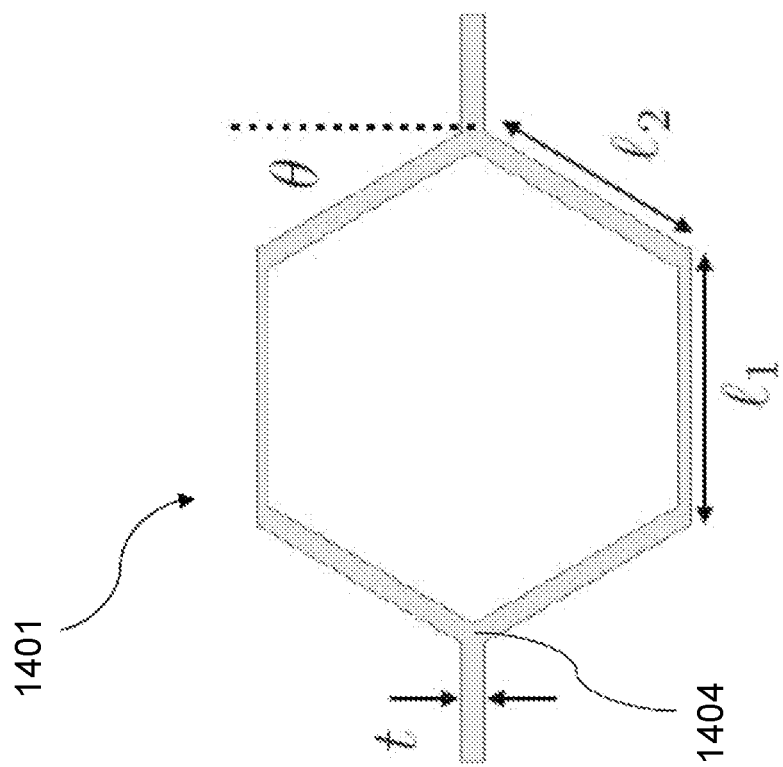
FIG. 12 depicts the cross-section of an open unit cell consistent with the invention.

FIG. 12 depicts the cross-section of an open annular cell 1401 consistent with the invention. The open annular cell 1401 comprises intersecting walls of material 1404 and open space 1406. The open annular cell 1401 is defined by the parameters of side lengths of the walls of material 1404, thickness of the walls of material 1404, and angles between the walls of material 1404. Advantageously, the parameters defining the open cells can be adjusted to achieve varying properties of the sealing element. For example, the parameters defining the open cells can be optimized for the material comprising the open cells.

Figure 13:
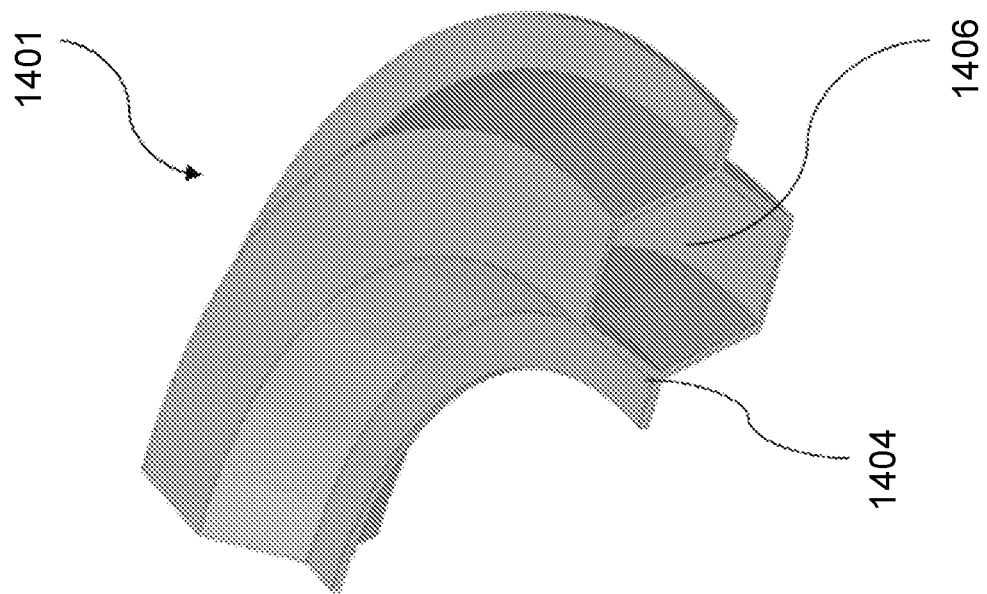
FIG. 13 depicts a perspective view of an open unit cell consistent with the invention.

FIG. 13 depicts a perspective view of an open annular cell 1401 consistent with the invention. The open annular cell 1401 comprises walls of material 1404 and open space 1406 forming a generally tubular shape.

Figure 14:
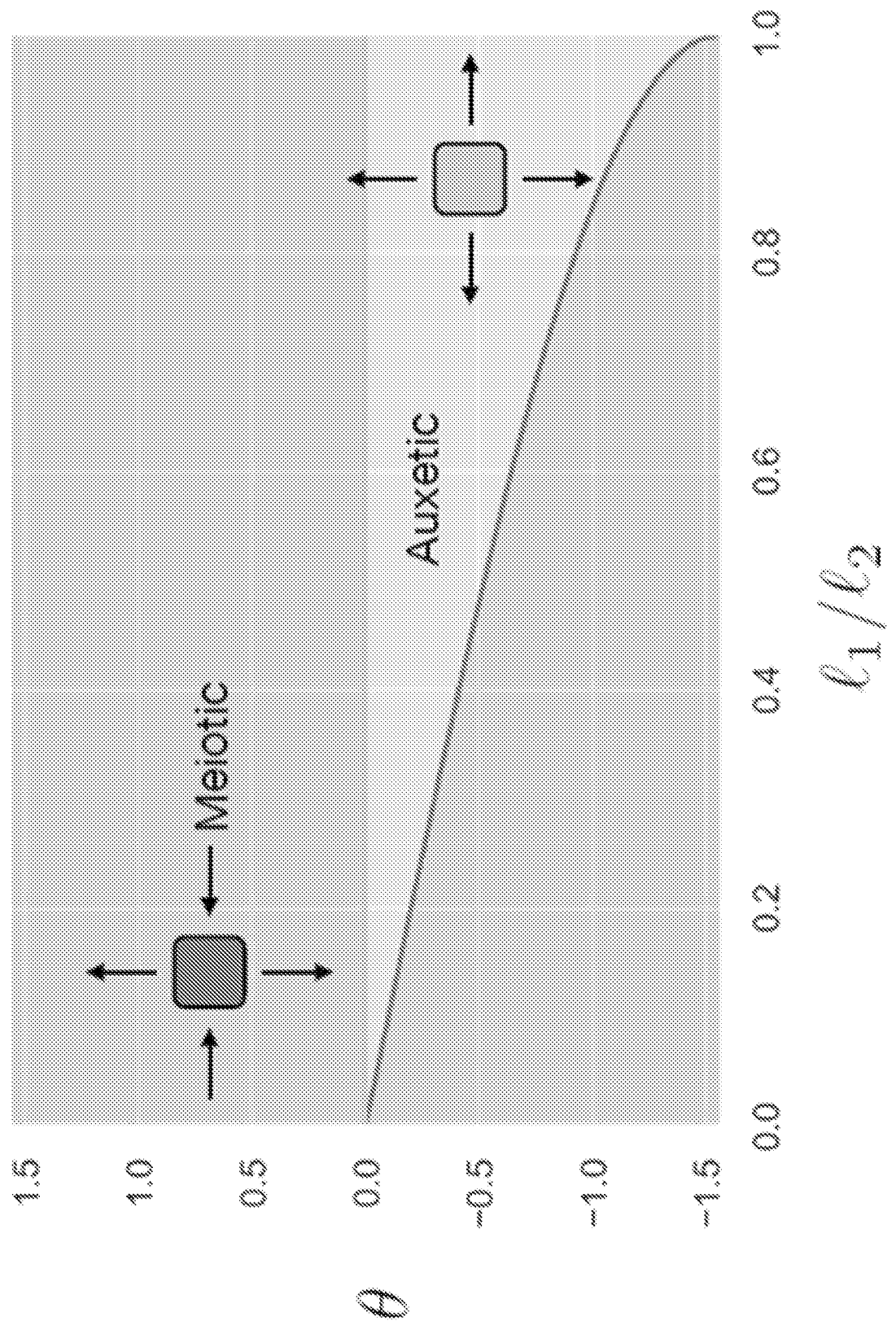
FIG. 14 is a graph showing the effect of varying parameters of open unit cells.

FIG. 14 depicts a graph showing the effect of varying parameters of open unit cells. The side lengths of the polygonal planes of material and angles between the polygonal planes of material alone can be used to create an auxetic sealing element or a meiotic element.

Figure 15:
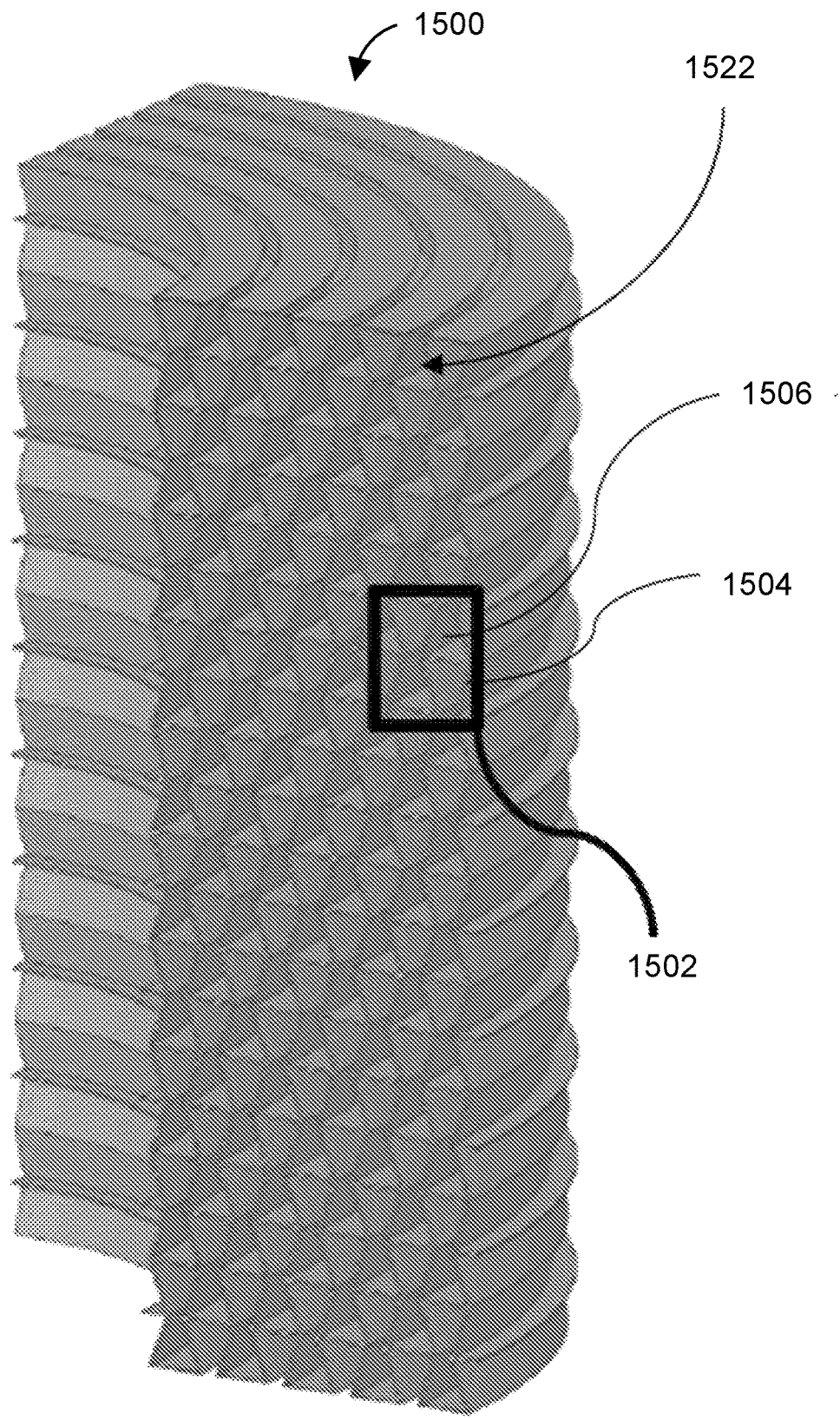
FIG. 15 shows a sealing element with varying parameters of the open unit cells.

FIG. 15 depicts a twin-trapezoid example of a sealing element 1500 comprising a plurality of open cells 1502 consistent with the invention comprising intersecting walls of material 1504 and open space 1506. The parameters of the plurality of open cells defines an auxetic structure 1522 that exhibits auxetic properties. The auxetic structure 1522 with auxetic properties means the structure expands radially when under radial tension (which logically includes axial compression conditions such that there is radial tension relative to the axial pressure). The sealing element 1500 expands radially when being stretched axially. Auxetics are structures or materials that have a negative Poisson's ratio. When stretched, they become thicker perpendicular to the applied force. This occurs due to their particular internal structure and the way this deforms when the sample is uniaxially loaded.

Figure 16:
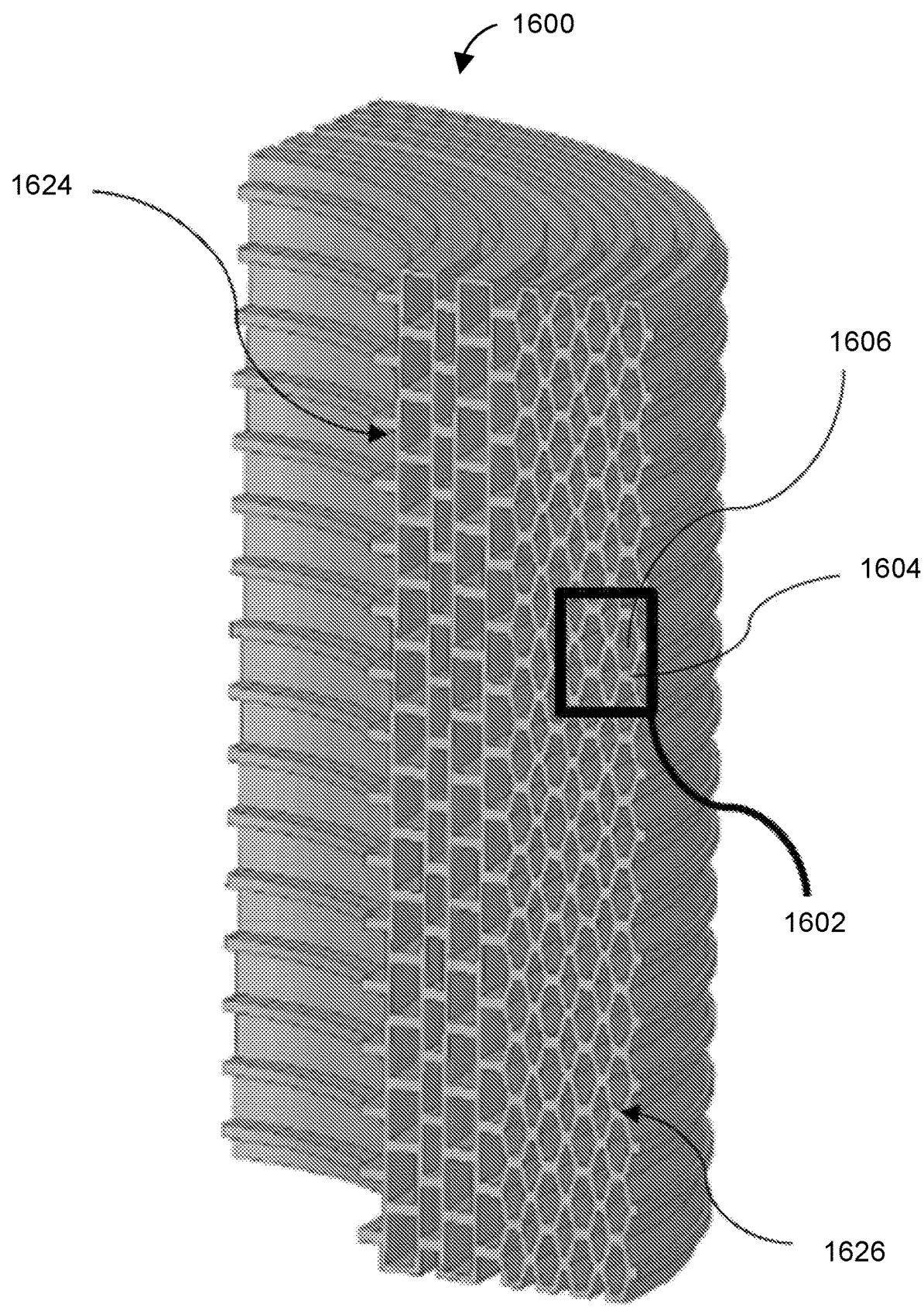
FIG. 16 depicts an example of a sealing element with open unit cells.

FIG. 16 depicts another example of a meiotic sealing element 1600 comprising a plurality of open cells 1602 consistent with the invention comprising intersecting walls of material 1604 and open space 1604. A first, meiotic set of open cells 1622 exhibits meiotic deformation, becoming thinner in a direction perpendicular to tension (thicker perpendicular to compression). A second neutral set of open cells 1624 deforms exhibits de minimus stress in response to strain. Materials of the disclosure may be characterized according to descriptions in Dagdelen, 2017, Computational prediction of new auxetic materials, Nat Comm 8:a313, incorporated by reference.

Figure 17:
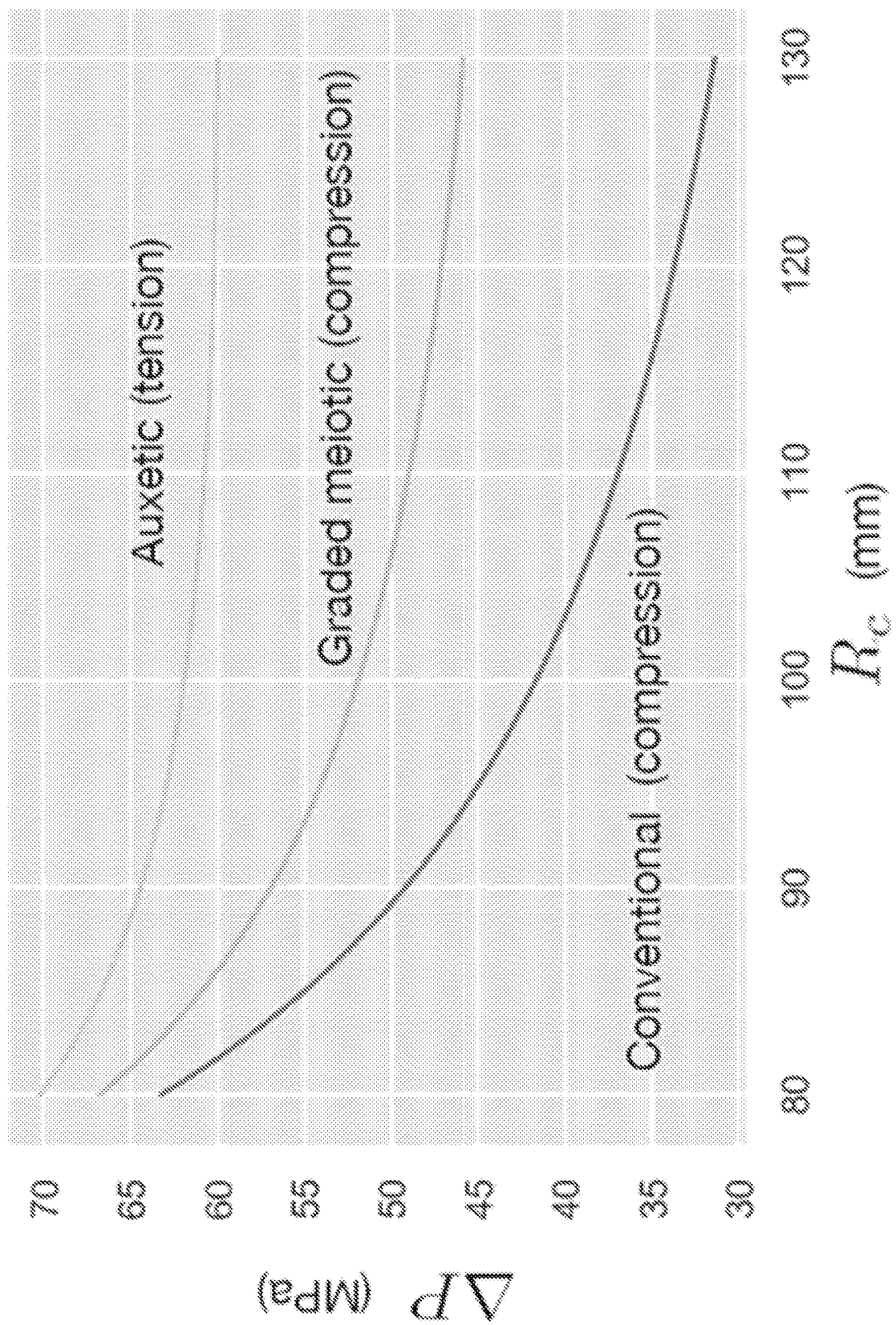
FIG. 17 depicts the pressure differentials from varying parameters of the open unit cells.

FIG. 17 depicts the pressure differentials for sealing elements comprising pluralities of open cells with parameters that result in auxetic, meiotic, and conventional properties when facing a consistent set force of 120 kN. Auxetic sealing elements are less prone to fatigue and crack propagation than meiotic sealing elements. Advantageously, the various sealing elements may be manufactured from a molding and stacking process.

FIGS. 18-23 show various metamaterial structures that may be used in variable thermal expansion (VTE) embodiments 500 in which, in each case, the metamaterial structure includes two materials.

Figure 18:
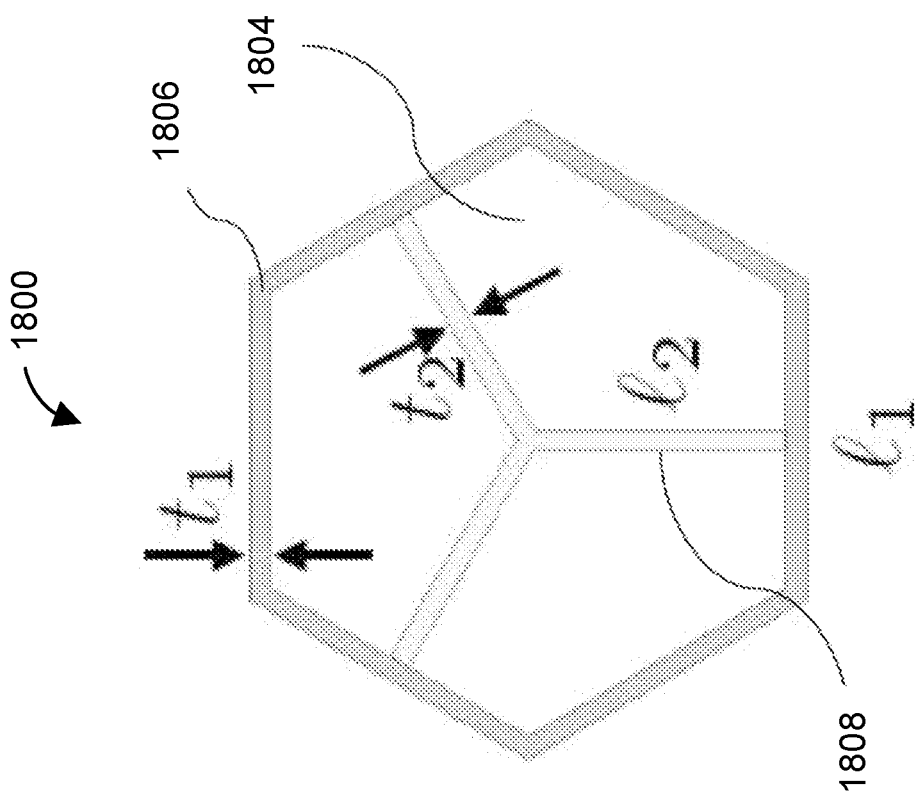
FIG. 18 depicts the cross-section of open unit cells comprising two materials.

FIG. 18 depicts the cross-section of a tri-hexagonal open cell 1800 comprising two materials. The tri-hexagonal open cell 1800 comprises intersecting walls a first material 1806 and a second material 1808. As shown, the first set of open cells comprising the first material 1806 and open space 1804, and a second set of open unit cells comprising the second material 808 and open space 1804, which is shared between the open unit cells. As a result, the second set of open unit cells is disposed within the open space 1804 of the first set of open unit cells. Alternatively, the open unit cell may be considered a single open unit cells comprising a first material 1806 and a second material 1808.

Advantageously, the first material 1806 and second material 1808 may have different thermal expansion coefficients, and the plurality of open cells may decrease net thermal strain on the sealing element in comparison to a plurality of open cells comprising a single material. This limits the fatigue that thermal cycling has on sealing elements, limiting the variations in the contact pressure of the seal that result from repetitive contraction and expansion of the sealing element. By selecting materials, the sealing element comprising two or more materials can be tuned to decrease or eliminate net thermal strain. For example, the two materials may be a filled polyether ether ketone polymer and an unfilled polyether ether ketone polymer.

Sealing elements comprising more than one material may be advantageously additively manufactured or, for example by using dual-extruders which each extruder equipped with its own material.

Figure 19:
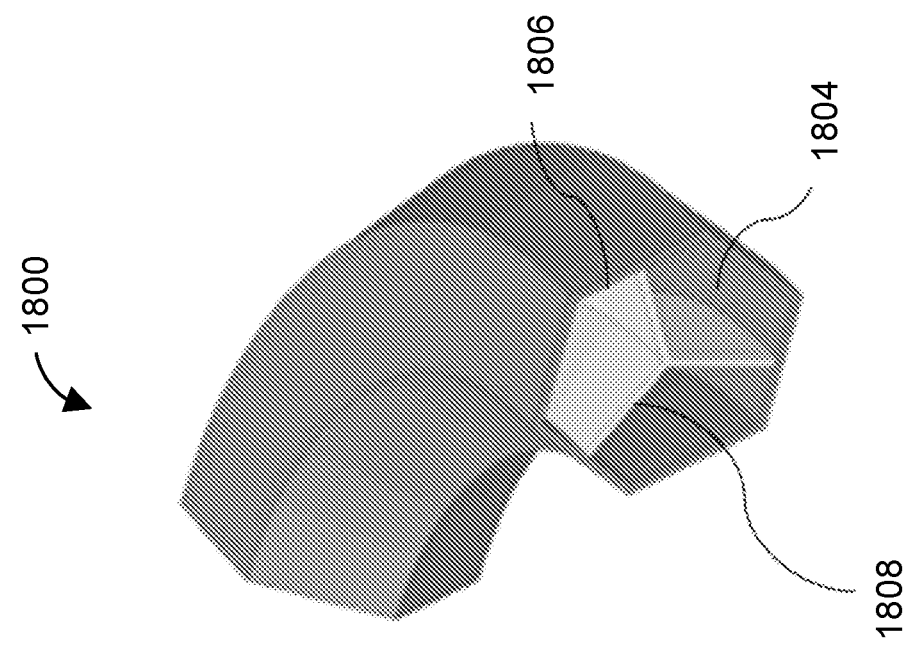
FIG. 19 depicts a perspective view of open unit cells comprising two materials.

FIG. 19 depicts a perspective view of the tri-hexagonal open cell 1800. The open annular cell comprises first material 1806 and second material 1808. The open annular cell depicted is designed to decrease net thermal strain.

Figure 20:
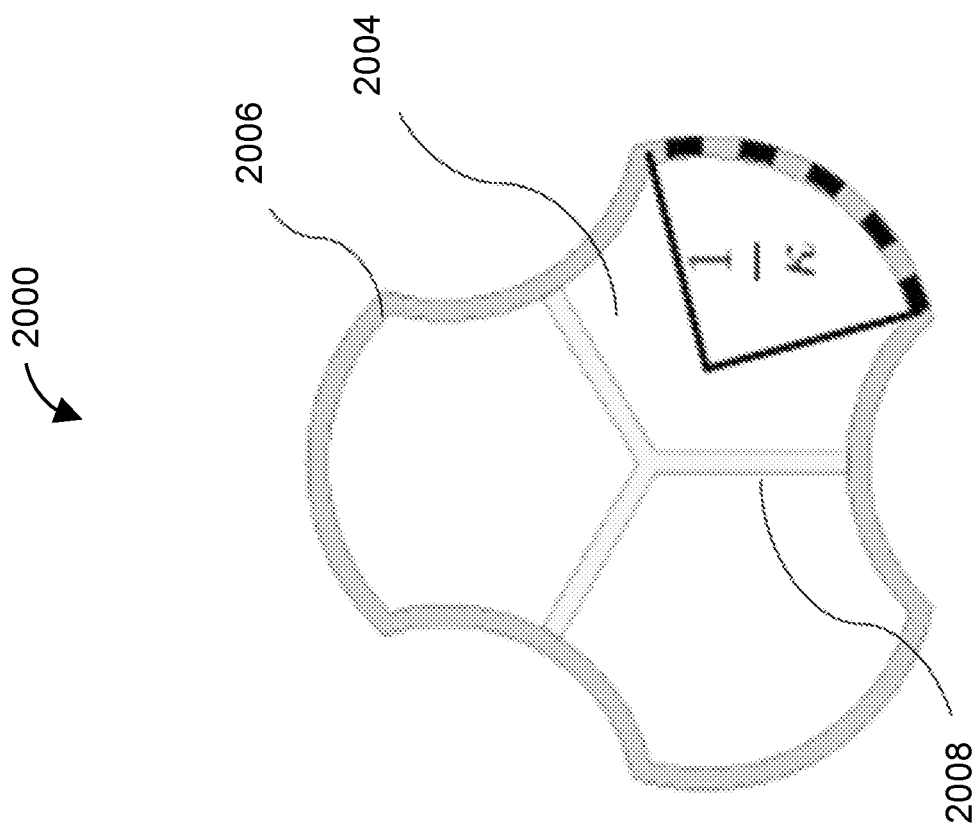
FIG. 20 depicts the cross-section of open unit cells comprising two materials.

FIG. 20 depicts a cross-section through a tri-symmetric tessellating open cell 2000. In cross-section, the tri-symmetric tessellating open cell 2000 has three-fold rotational symmetry. Due to convex and concave surface curvature, the cells can tesselate together. The tri-symmetric tessellating open cell 2000 comprises intersecting walls of a first material 2006 and a second material 2008.

Figure 21:
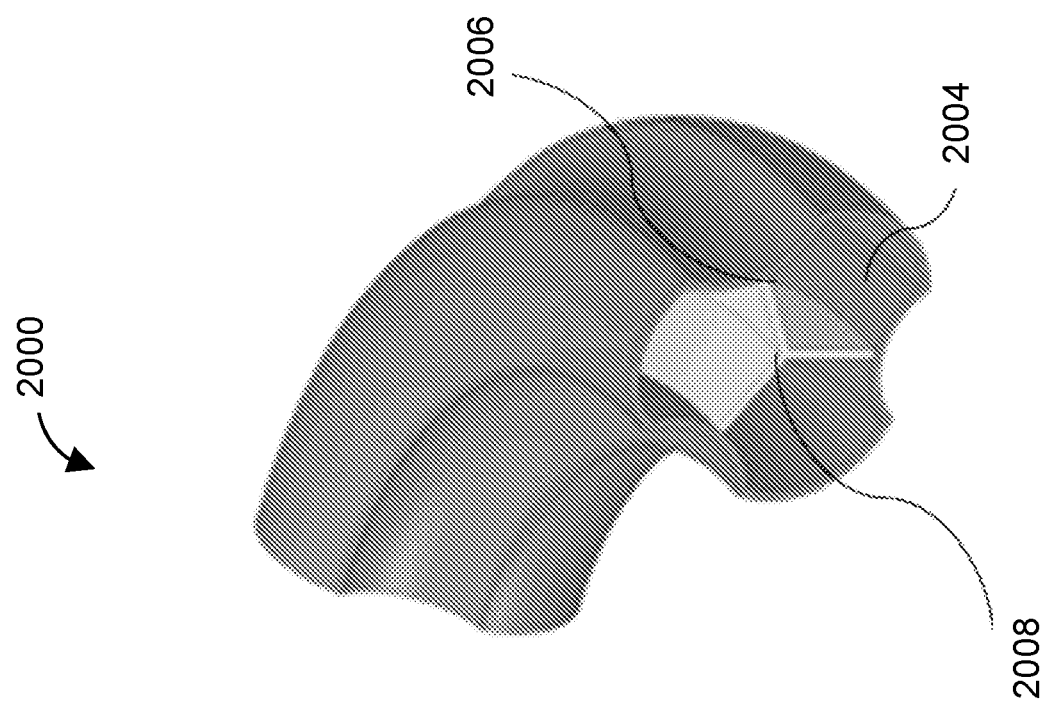
FIG. 21 depicts a perspective view of open unit cells comprising two materials.

FIG. 21 depicts a perspective view of the tri-symmetric tessellating open cell 2000. The tri-symmetric tessellating open cell 2000 is designed to have a relatively high coefficient of linear thermal expansion.

Figure 22:
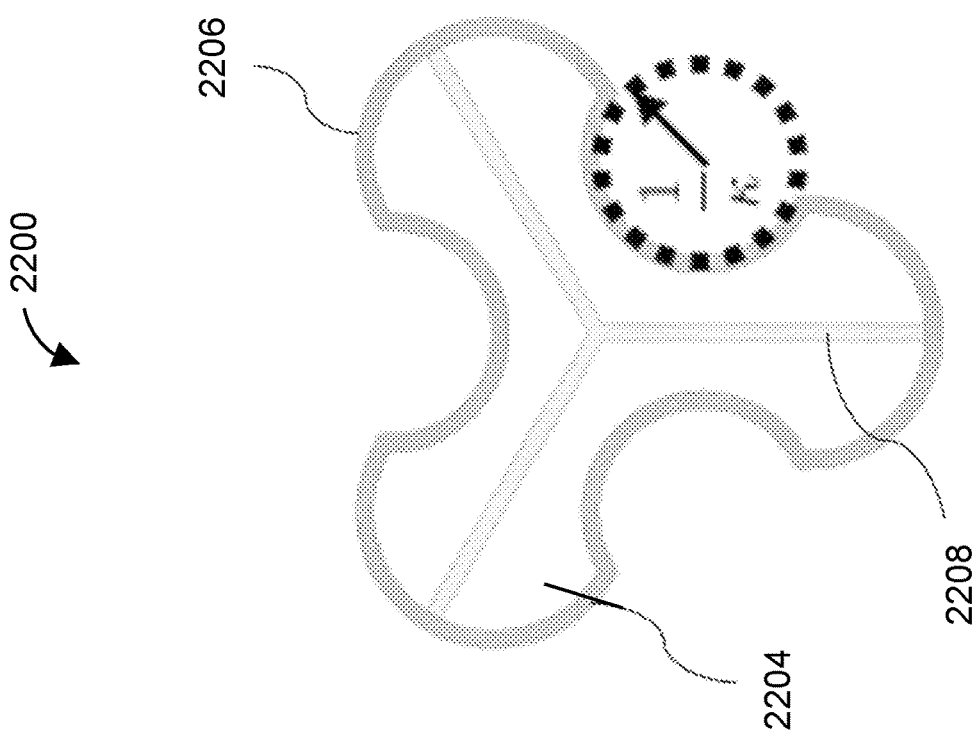
FIG. 22 depicts the cross-section of open unit cells comprising two materials.

FIG. 22 depicts a cross-section through a tri-symmetric interlocking open cell 2200 comprising two materials. The tri-symmetric interlocking open cell 2200 has walls of a first material 2206 and a second material 2208, leaving open space 2204. The cell 2200 has tri-fold rotational symmetry and will tesselate with itself and interlocks with itself.

Figure 23:
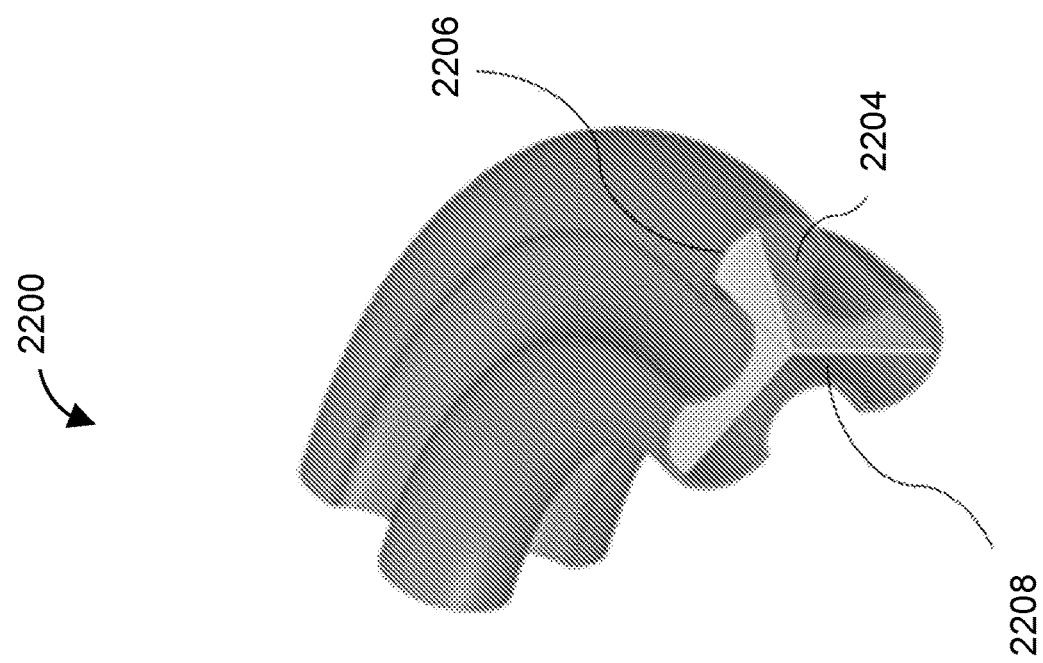
FIG. 23 depicts a perspective view of open unit cells comprising two materials.

FIG. 23 depicts a perspective view of the tri-symmetric interlocking open cell 2200. The tri-symmetric interlocking open cell 2200 has a negative coefficient of linear thermal expansion.

Figure 24:
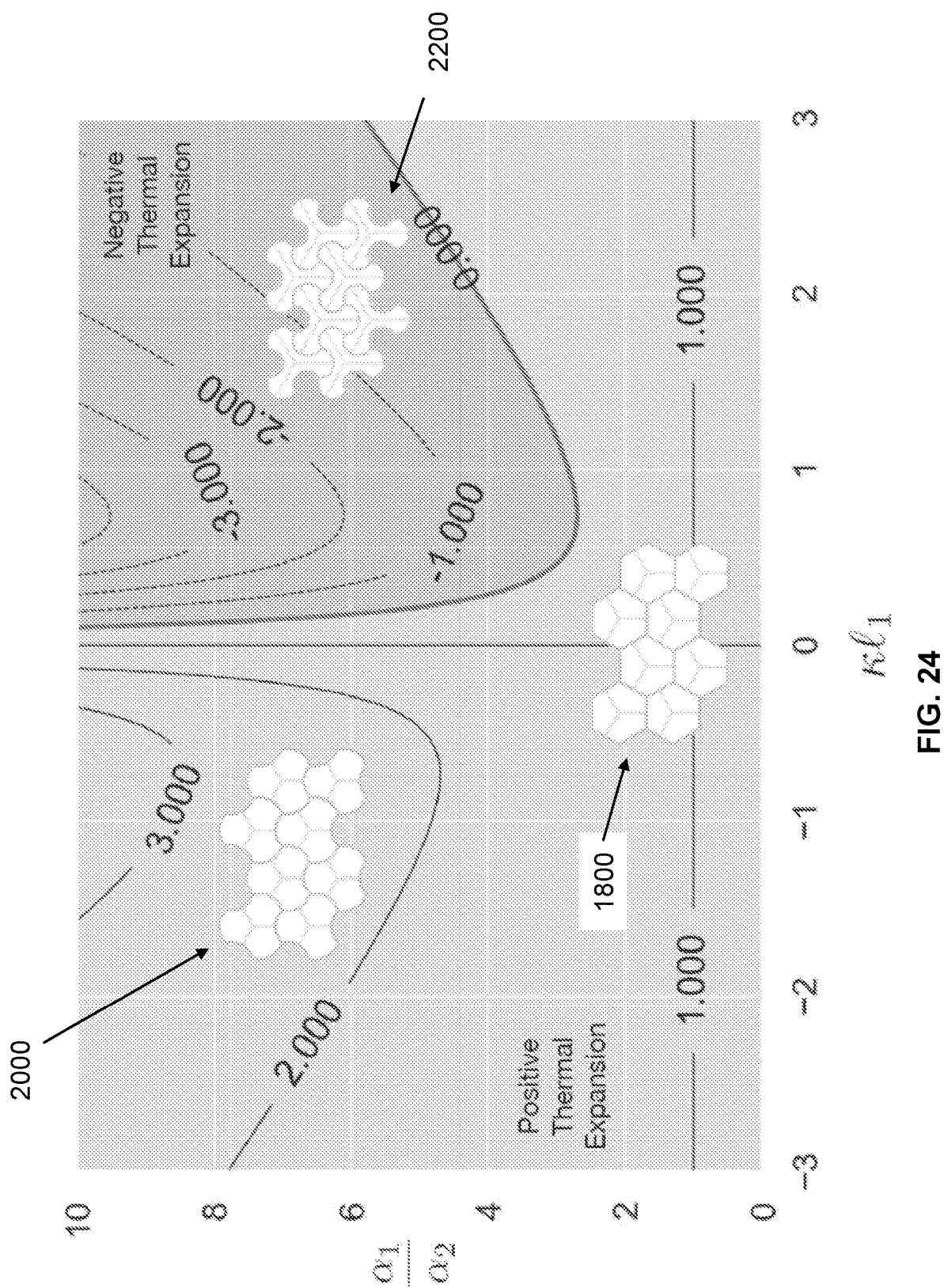
FIG. 24 depicts properties of variable thermal expansion (VTE) metamaterials.

FIG. 24 depicts properties of components made according to the variable thermal expansion (VTE) embodiments 500 shown in FIGS. 18-22. The figures shows where the tri-hexagonal open cell 1800, the tri-symmetric tessellating open cell 2000, and the tri-symmetric interlocking open cell 2200 lie in a plot of coefficients of thermal expansion alpha in directions 1 and 2 over depths of curvature as measured by radius fraction of circumference k included in wall curved in cross-section.

Figure 25:
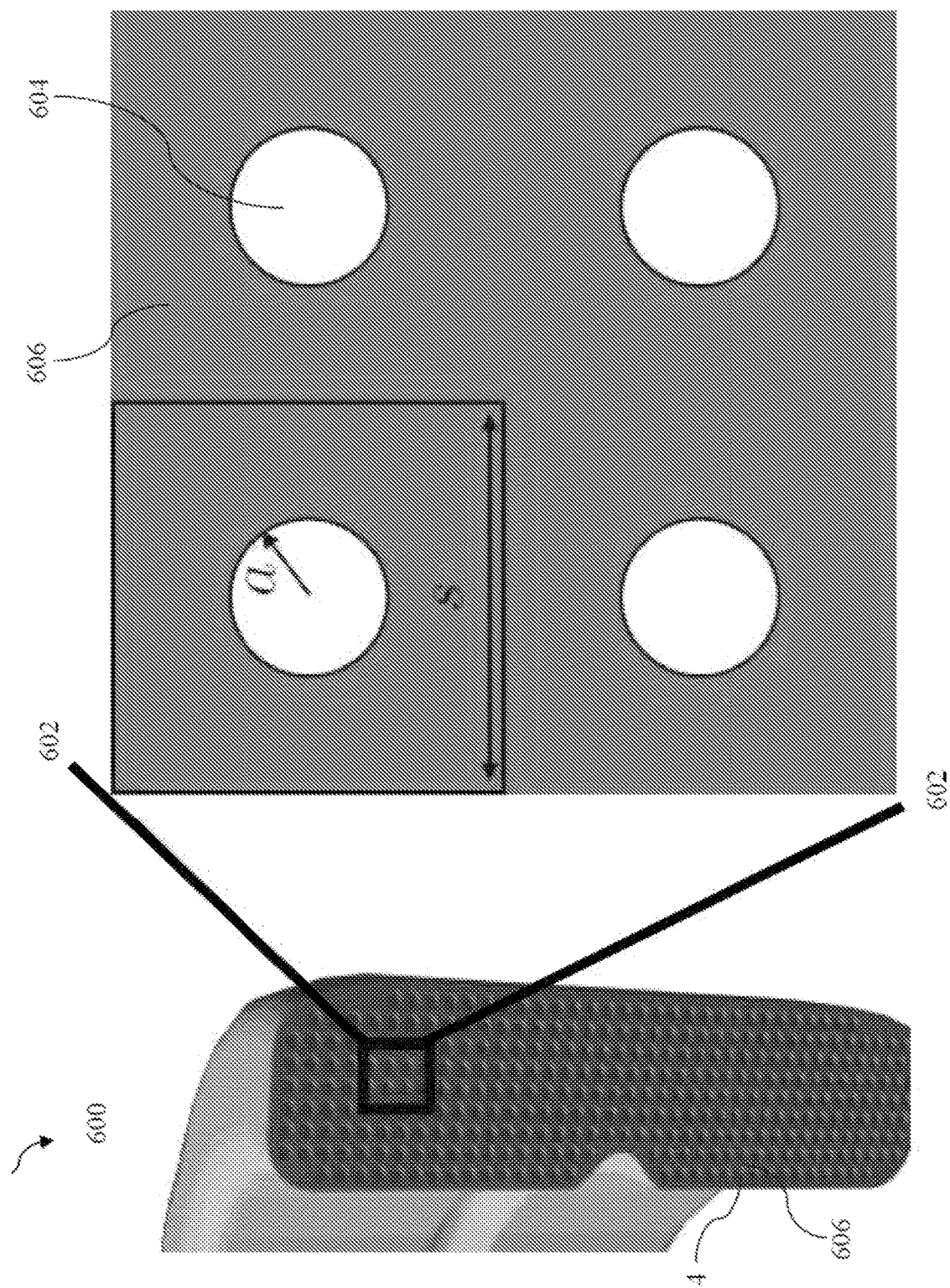
FIG. 25 is a detailed view of smart-buckling embodiments of metamaterials.

FIG. 25 shows details of a smart-buckling embodiment 600 of a component of the invention comprising a lattice. The depicted embodiment provides a sealing element comprising a lattice. The plurality of open cells 602 comprise a lattice pattern that promotes long-wavelength deformation of the sealing element. The lattice pattern may comprise a pattern of hollow "pores" 604 disposed within the material, thereby forming planes of the material 606 and open space 604. The pores have regular spacing with a regular cross-sectional radius. Thinning the material walls between pores controls how the element will buckle when pressure is applied to the sealing element vertically. Although it is generally understood that unintended voids and cavities in a structure weaken the material and lead to mechanical failure, the introduced array of pores consistent with the invention can lead to enhanced capabilities. The plotted number represent geometries shown in FIG. 26.

Figure 26:
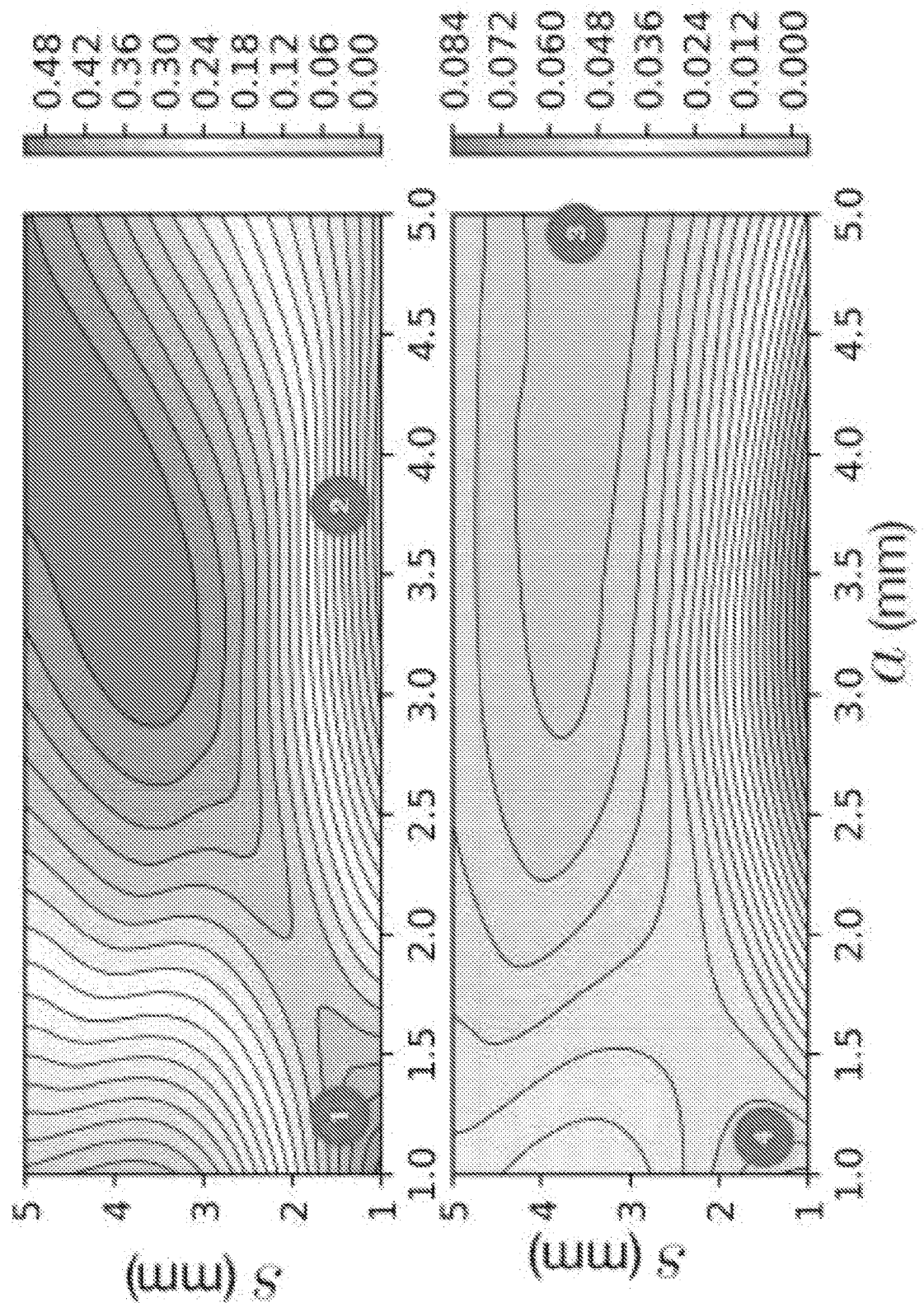
FIG. 26 gives contour plots of expansion under pressure for varying lattice elements.

FIG. 26 depicts contour plots of average radial expansion under axial pressure for varying lattice elements. By varying the radius and spacing of the pores, a wide variety of buckling deformation are tunable. Advantageously, the sealing element may be manufactured with an additive manufacturing method.

Figure 27:
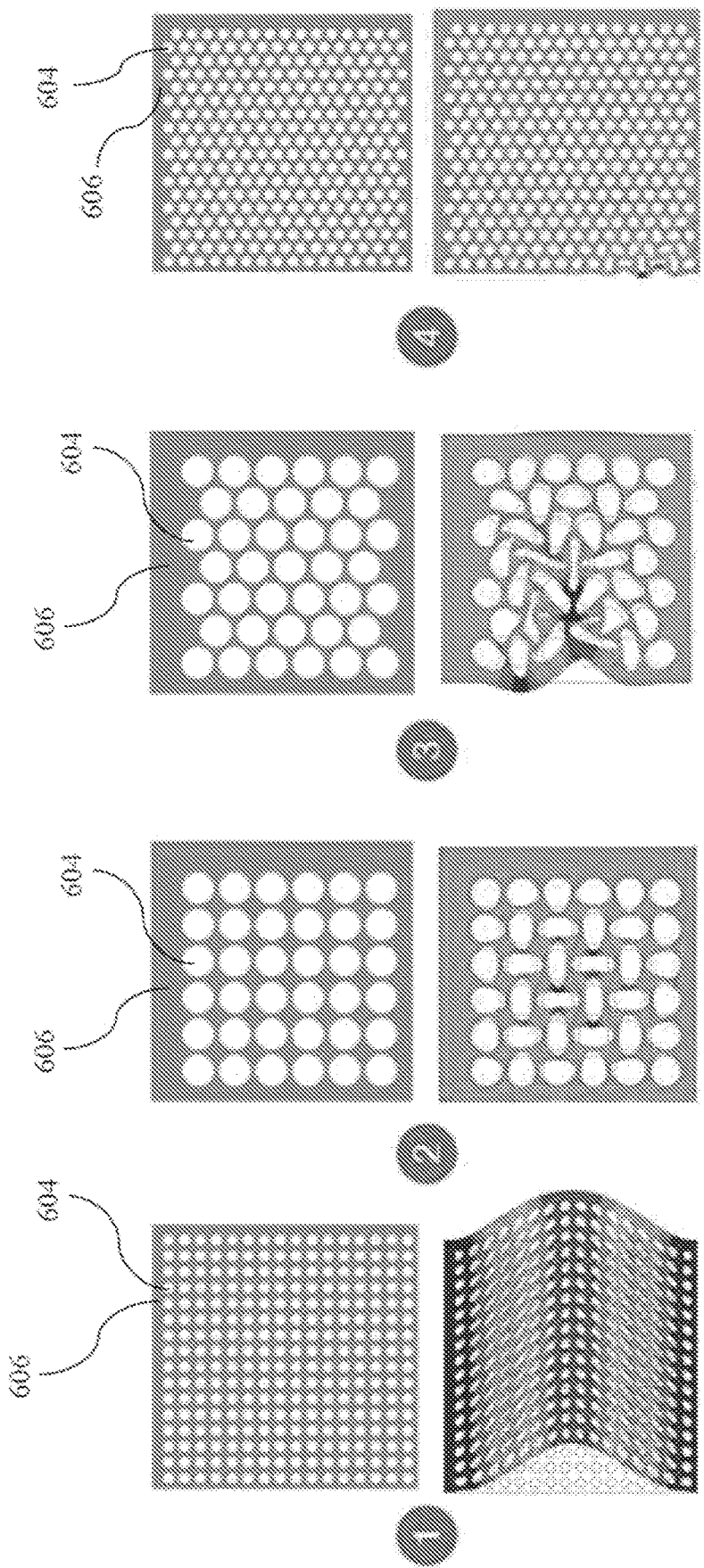
FIG. 27 depicts buckling deformation under pressure for varying lattice elements.

FIG. 27 depicts buckling deformation under pressure for varying representative shapes. Undeformed patterns are shown in the top row with deformed surfaces shown in the bottom row. The pattern marked by (1) has the highest performance, which a large radial expansion using "long-wavelength" deformation. The patterns marked by (2), (3), and (4) are each poorly performing, with buckling modes that are "short-wavelength" corresponding to internal deformation or surface wrinkling.

Long-wavelength deformation means deformation that causes global deformation of the structure, for example global deformation of the sealing element. Short-wavelength deformations means deformation that causes alternating instability within the structure, for example deformation of unit cells of the plurality of a unit cell of the sealing element.

In aspects of the invention, the sealing element comprises a thermoplastic polymer, for example a thermoplastic polyether such as polyether ether ketone. The polyether ether ketone may be an unfilled (i.e. neat) polyether ether ketone. The polyether ether ketone may be a filled polyether ether ketone, for example a glass-fiber reinforced polyether ether ketone. The polyether ether ketone may be polyether ether ketone sold by Solvay S.A., with a headquarters in Brussels, Belgium, under the trade name KETASPIRE. Advantageously, polyether ether ketone is corrosion resistant. Polyether ether ketone also advantageously becomes more compliant under higher temperatures, including temperatures greater than 170 degrees C. In addition, in contrast with elastomers, polyether ether ketones become more ductile under higher temperatures, including temperatures greater than 170 degrees C., and may achieve larger deformations that elastomers at elevated temperatures.

However, it is understood that the sealing elements or connectors of the present invention can comprise any material that provides greater chemical, pressure, and/or temperature resistances than an elastomer in order to retain its seal without succumbing to mechanical failure, thermal cycling fatigue, and/or failure resulting from corrosion under conditions that elastomer-based sealing elements would fail. Exemplary materials include PEEK and maraging steel among others.

For example, the plurality of repeats of an open unit of the sealing element may continue to promote deformation of the sealing element laterally outward from the mandrel without succumbing to mechanical failure, thermal cycling fatigue, and/or failure resulting from corrosion when subject to temperatures between 200 degrees C. and 400 degrees C. The sealing element may continue to hold the seal without succumbing to failure at a temperature greater than 170 degrees C., 175 degrees C., 200 degrees C., 225 degrees C., 250 degrees C., 300 degrees C., or 400 degrees C. The sealing element may continue to hold the seal without succumbing to failure at a temperature of about 225 degrees C. for a period of time greater than one month. The sealing element may continue to hold the seal without succumbing to failure at a temperature of about 225 degrees C. for a period of time greater than two months, three months, six months, one year, or two years. The sealing element may continue to hold the seal without succumbing to failure at a temperature of about 300 degrees C. or greater for a period of time greater than one day. The sealing element may continue to hold the seal without succumbing to failure at a temperature of about 300 degrees C. for a period of time greater than two days, three days, four days, five days, six days, one week, two weeks, three weeks, or one month.

The plurality of repeats of an open unit of the sealing element may continue to promote deformation of the sealing element laterally outward from the mandrel without succumbing to mechanical failure, thermal cycling fatigue, and/or failure resulting from corrosion at depths greater than 4 km. The sealing element may continue to hold the seal without succumbing to failure at depths greater than 3.4 km. The sealing element may continue to hold the seal without succumbing to failure at depths between 4 km and 6 km. The sealing element may continue to hold the seal without succumbing to failure at a depth greater than 6 km.

The plurality of repeats of an open unit of the sealing element may continue to promote deformation of the sealing element laterally outward from the mandrel without succumbing to mechanical failure, thermal cycling fatigue, and/or failure resulting from corrosion when subject to pressures greater than 150 MPa. The sealing element may continue to hold the seal without succumbing to failure at pressures greater than 70 MPa, 80 MPa, 90 MPa, 100 MPa, 125 MPa, 150 MPa, or 175 MPa.

In doing so, the sealing elements of the present invention allow drilling systems to access enhanced geothermal zones.

Aspects of the disclosure provide a component for a geothermal system where the component is made with materials of the disclosure and may, in particular, be a casing segment connector for downhole drilling equipment, whereby those connectors have improved accommodation of thermal stresses.

Figure 28:
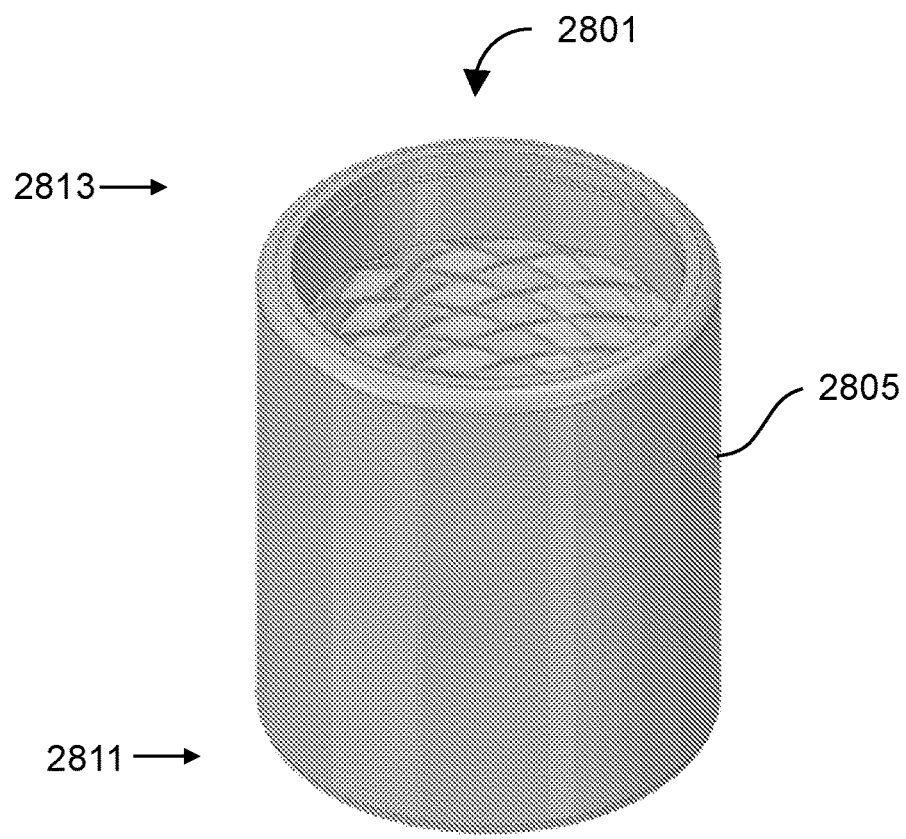
FIG. 28 shows a connector of the invention.

FIG. 28 shows a connector 2801 for connecting segments of tubing used in wells drilled into high temperature, high pressure, and highly corrosive environment. The connector 2801 includes a hollow cylindrical body 2805 with upper end 2813 and lower end 2811. Either or both of upper end 2813 and lower end 2811 may have a blank or threaded surface for attaching to another casing. The connector 2801 may have dimension of a short thread casing coupling, a long thread casing coupling, or a buttress thread casing coupling. Preferably the body 2805 is made of a high strength corrosion-resistant metallic alloy (e.g., steel such as maraging steel). Optionally the body 2805 is made of a high strength corrosion-resistant thermoplastic such as PEEK.

Figure 29:
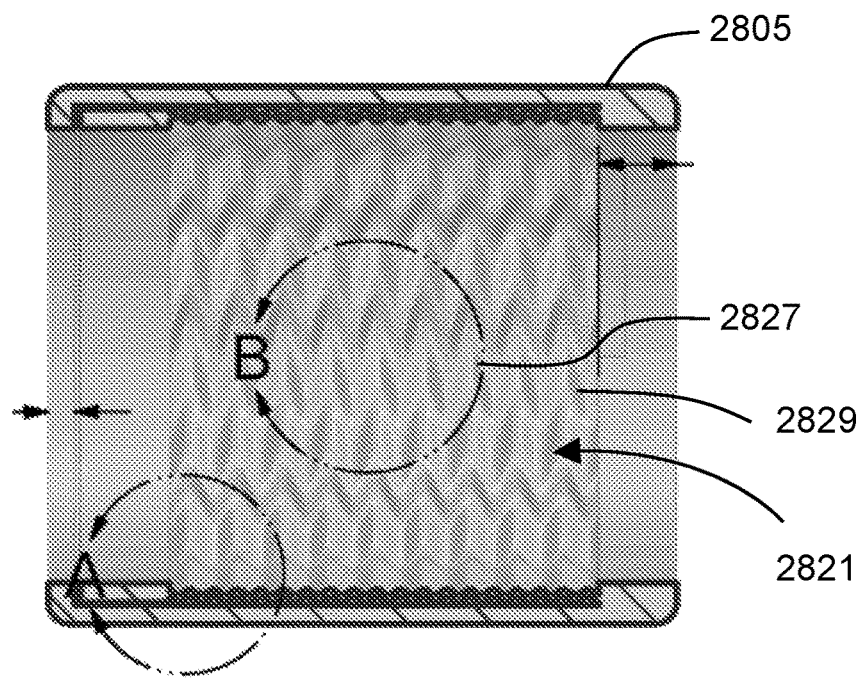
FIG. 29 is an axial cross-section through the body of the connector.

FIG. 29 is an axial cross-section through the body 2805, showing an internal shell 2821 of the body 2805. The inner shell 2821 comprises a metamaterial structure 2827 comprising a plurality of repeats of a cell 2829.

Figure 30:
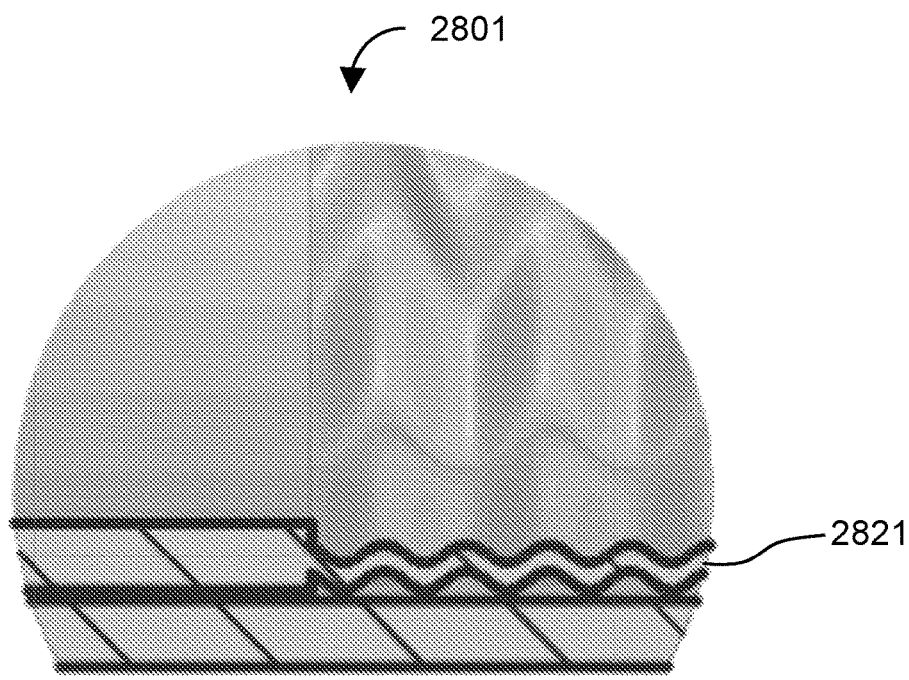
FIG. 30 is a detail view of an inner shell of the connector.

FIG. 30 is a detail view of circle A. As shown, in some embodiments only an internal shell 2821 of the body 2801 has the metamaterial structure. Optionally, the entire body 2801 (not shown) is formed with a metamaterial structure.

Figure 31:
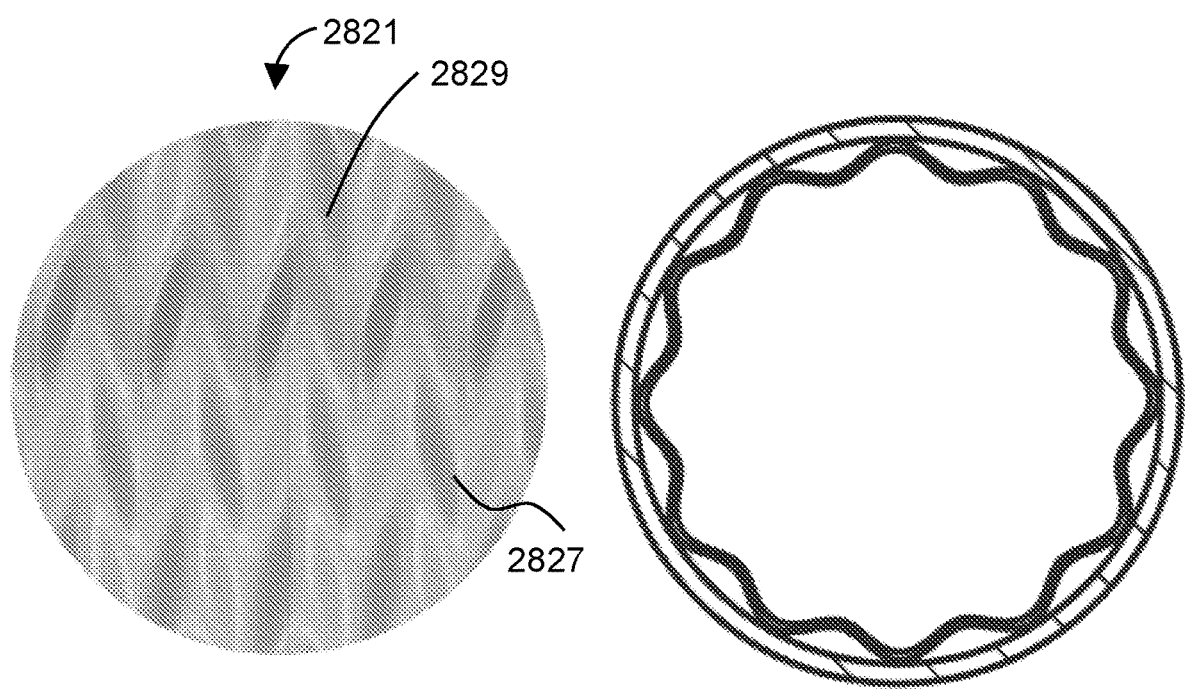
FIG. 31 is a detail view of a metamaterial structure of the inner shell.

FIG. 31 is a detail view of circle B. The metamaterial structure 2827 has a plurality of repeats of a cell 2829

Figure 32:
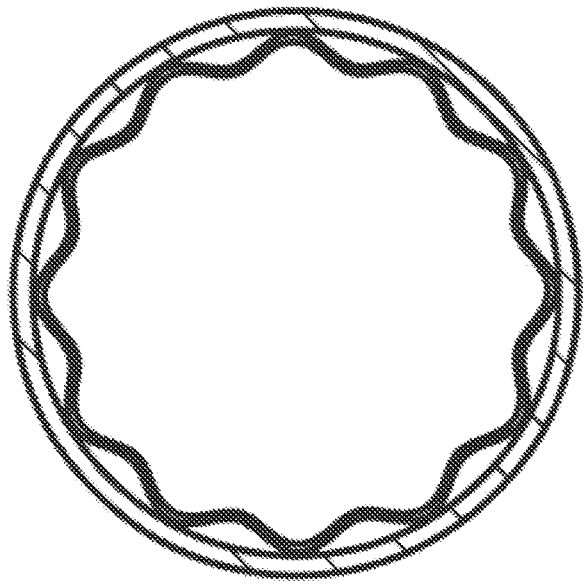
FIG. 32 is a cross section through the connector orthogonal to an axis of the body.

FIG. 32 is a cross section through the body 2805 orthogonal to an axis of the body. Due to the metamaterial structure, when pressure is applied axially to the connector, the open cells promote deformation of the connector outward to an extent greater than that of a connector made with a bulk monolithic structure and no metamaterial structure. The flexible connectors of the invention allow downhole drilling equipment to greatly increase the depths the equipment can access before facing mechanical failure, including allowing access to depths greater than 4 km and geothermal zones greater than 300 degrees C. Here, the invention provides a metamaterial structure that can be used with a high strength metallic alloy such as maraging steel g300 in components of geothermal systems to offer those components thermal expansion accommodation that does not exist in prior art connectors. Embodiments provide a connector component for connecting segments of tubing used in wells drilled into high temperature, high pressure, and highly corrosive environments. The connector component includes a hollow cylindrical body in which an internal, substantially cylindrical volume of the body has a metamaterial structure. The metamaterial structure includes a plurality of cylindrically repeated cells. The cylindrical body may further include threaded surfaces at either upper and/or lower ends of the body to attach to a joint or another casing. Preferably, the body has walls comprising a high strength corrosion-resistant metallic alloy. The material of the walls may be a high strength corrosion-resistant thermoplastic.

Casing Connectors

Enhanced geothermal systems (EGS) generally refer to man-made subterranean reservoirs made to access the more than 100 GW of power potentially available from within the Earth. The cost of drilling such reservoirs scales up quickly with depth, and the chance of failure grows due to high pressure, temperature, and corrosion. For deep wells, drilling cost is a barrier that can prohibit accessing such energy. The disclosure provides casing connectors that leverage computational geometry and additive manufacturing (AM).

Casing failure is a major barrier for EGS. A substantial portion of well cost, and well failure, can be traced to the casing program, with steel and cement contributing nearly 40% of the estimated well drilling costs. Well failures arise from underperforming materials and tubular goods.

Thermal expansion causes casing failure. An EGS well may run to a depth greater than 5 kilometers, with operational temperatures of at least 200° C., and climbing above 350° C. in some conditions. In these environments the cemented casing has no room to thermally expand, and thermal stresses alone can lead to failure of the steel. The disclosure replaces existing rigid casing connectors in high temperature environments with a flexible connector. By introducing a flexible connector, thermal expansion stresses can be accommodated.

Additive manufacturing allows complex geometries and cost-effective material usage, so that an expansion joint can be integrated into a casing, providing a high strength flexible coupling. Using analytical and computational tools, the disclosure provides multi-corrugated bellows that functions as an expansion joint in EGS components without sacrificing torsional or bending stiffness. Corrugated shells provide increased burst resistance when subjected to internal pressure. Casing connectors of the disclosure may be composed of a single part, with surfaces that can be tapped with API, premium, or proprietary thread specifications to interface with the casing. The design connects the two tubulars through a multi-corrugated surface that is designed to deform appreciably in the axial direction, while remaining relatively rigid under other loads. A multi-corrugated surface may be housed within a smooth annular exterior, with no additional clearance required compared to standard connection stock. Connector design may be parametrically controlled, so changes in casing size, the usage of external upset or non-upset casing, or the addition of functional geometry (e.g., O-ring grooves, torque shoulders, etc.) can all be manipulated without substantive change in the manufacturing process. Preferred embodiments use a powder bed fusion (PDF) process. PBF functions by depositing a layer of atomized metallic powder on a build plate, and then a laser locally melts the powder according to the design. The powder bed fusion (PDF) process produces a part that is essentially isotropic, in contrast to other layer-building methods and PDF works with materials such as SS316L and G300 maraging steel. In fact, high strength metals like G300 maraging steel and corrosion resistant alloys like SS316L are ideal. Strength and elongation are the primary desirable mechanical characteristics, and PDF preserves the isotropic, ductile, high strength characteristics of the base alloy.

Figure 33:
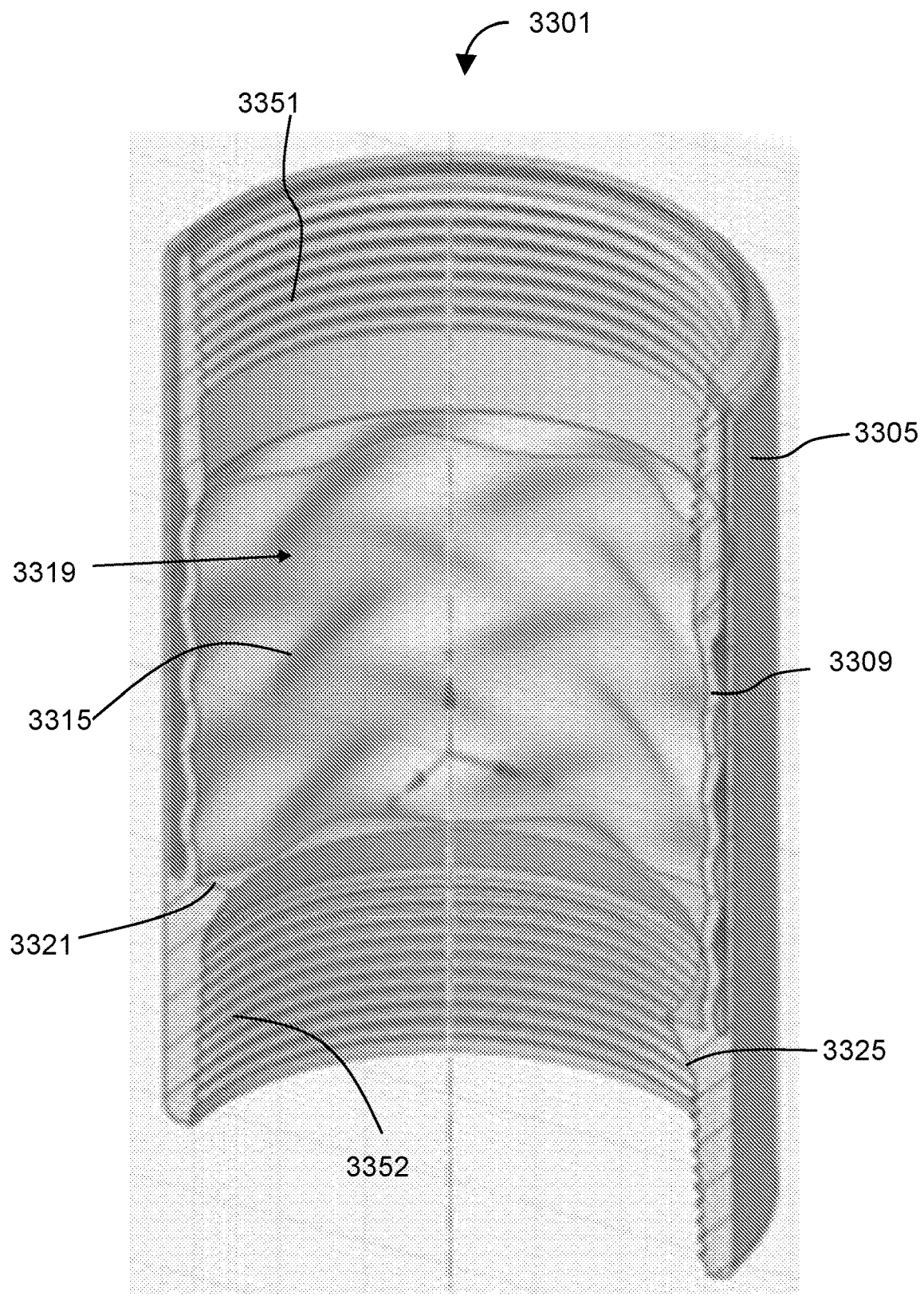
FIG. 33 shows a casing connector of the disclosure.

FIG. 33 shows a casing connector 3301 of the disclosure. The casing connector 3301 is designed for connecting casings in a geothermal well. The connector 3301 includes a hollow cylindrical body with upper and lower ends and a bellows 3309 disposed within the body. Preferably, an external surface of the body 3305 is substantially smooth and cylindrical. As shown, an upper end of the bellows has an upper mating face 3351 for coupling to a first casing, and a lower end of the bellows 3309 is connected to the lower end of the body 3305, where the lower end of the body includes a lower mating face 3352. The upper mating face 3351 and the lower mating face 3352 are both shown as threaded, but either or both could be smooth of threaded. The connector 3301 may be made by additive manufacturing (e.g., PDF) and threads may be added during additive manufacturing or tapped in after manufacturing.

The bellows 3309 may have a form defined by at least two sets of intersecting or interfering corrugations 3315. As shown, the bellows 3309 may present an undulating surface 3319 defined by intersections or interferences among two or more sets of corrugations 3315. The bellows 2209 may be connected to the body 3305 at either of the upper and the lower ends. In some embodiments, the bellows 3309 and the body 3305 are of one monolithic piece of material. For example, as shown, connector 3301 is all one integrally-formed piece of material, with the bellows 3309 formed to the body 3305 at the lower end (as drawn).

Interfering is used similarly to the sense in which waves that exhibit constructive or destructive interference, used here to describe corrugations that are present in sets that are not are not parallel and in which the extension of the ridge of one corrugation would be removed by the extension of a trough of a corrugation from a different set or in which the ridges of one set of corrugations are not continuous and intact as those ridges meet the ridges of another set of corrugations. A surface that is shaped as two or more non-parallel sets of intersecting or interfering sets of corrugations has non-straight ridges and pockets of space, described as open cells which are wells or recesses into the surface, but not typically holes through the surface. A multi-corrugated bellows is one which a surface of the bellows exhibits portions of ridges that would come in complete parallel sets but for the presence of second, non-parallel set of corrugations that intersects or interferes with the first set.

The connector 3301 may include a torque shoulder 3321. In some embodiments, at least one face of the torque shoulder is ramped, and the torque shoulder has a ramped face 3325. Due to the ramped face 3325, the torque shoulder 3321 not present an overhang during additive manufacturing. A downward facing face, or overhang, could create issues is certain additive manufacturing process whereby, during sintering or fusion, the overhang shields pockets of material and creates stress risers or other blemishes. The ramped face 3325 allows the connector 3301 to include the torque shoulder 3321 while maintain homogeneity and isotropy of the material even with an additive manufacturing process such as a powder bed fusion (PDF) process.

With a powder bed fusion (PDF) process, the connector 3301 may be made from steel, e.g., stainless steel 316L or g300 maraging steel, made here by additive manufacturing.

Figure 34:
FIG. 34 shows the connector that was made.

Optionally, either or both ends of the connector 3301 comprise additively manufactured threads. A mass of the connector may be less than about 4.2 kg. The depicted embodiment was made FIG. 34 shows the connector 3301 that was made. The depicted connector 3301 was made and had a mass of about 4.1 kg, significantly less than the approximately 4.5 kg of conventional casing connectors. The mass may preferably be between about 3.5 kg and 4.4 kg. The depicted threads were made by additive manufacturing (PDF) and found to operate to spec with minimal clean up and de-burring.

In certain embodiments, the bellows 3309 comprises additively manufactured steel in a multi-corrugated form, and the connector can accommodate up to 5% axial strain before yield and greater than 10% axial strain before failure.

Figure 35:
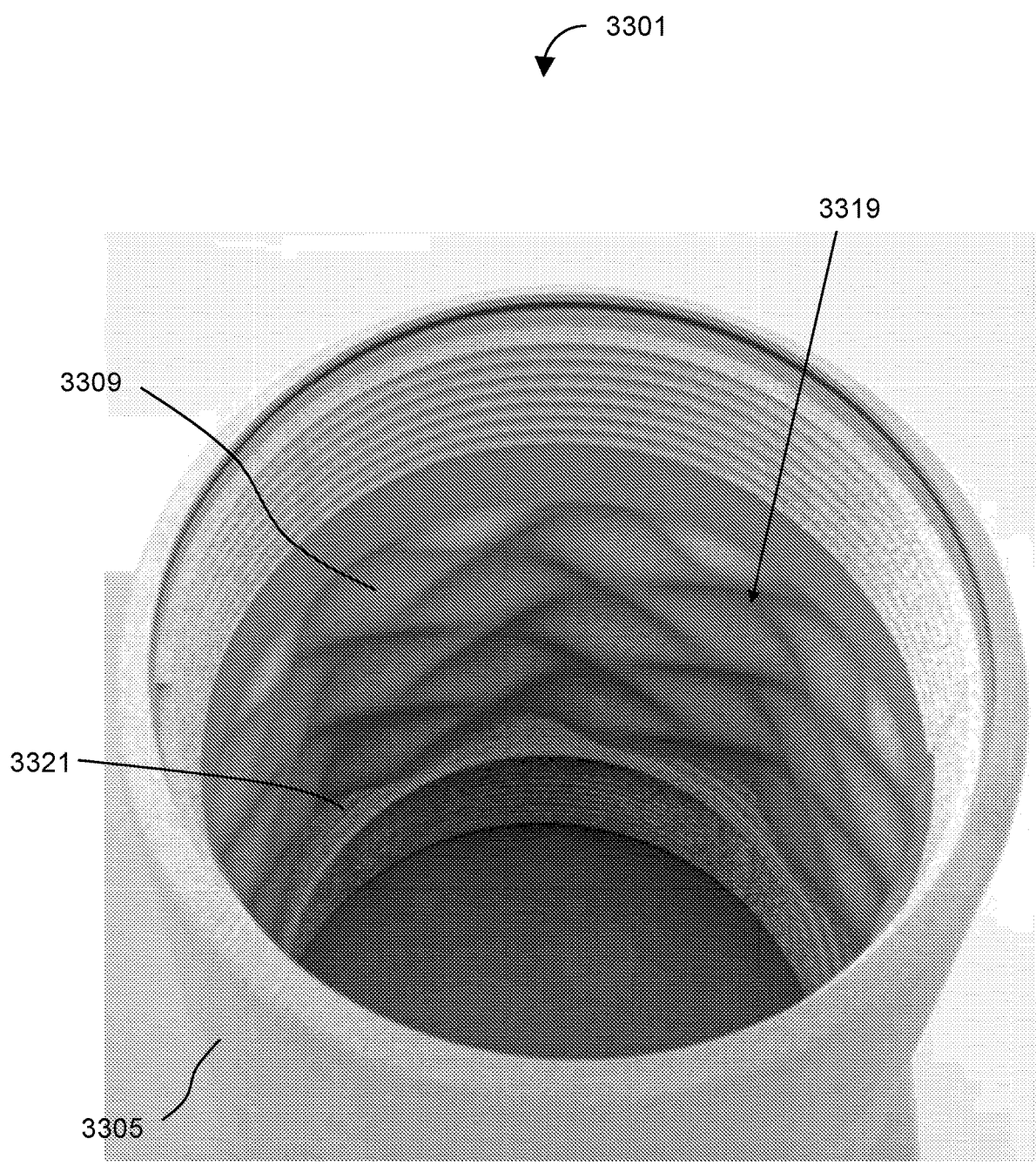
FIG. 35 is a perspective view into an inner bore of the connector.

FIG. 35 is a perspective view into an inner bore of the connector 3301, showing relationships among the body 3305 and bellows 3309. As shown, the bellows 3309 has a form defined by at least two sets of intersecting or interfering corrugations 3315 and the connector 3301 includes a torque shoulder 3321. Either end may be threaded. For example, with threads having dimension of a short thread casing coupling, a long thread casing coupling, or a buttress thread casing coupling. Preferably the connector is made of a high strength corrosion-resistant metallic alloy and the bellows 3309 is attached to the body 3305 at one end.

Figure 36:
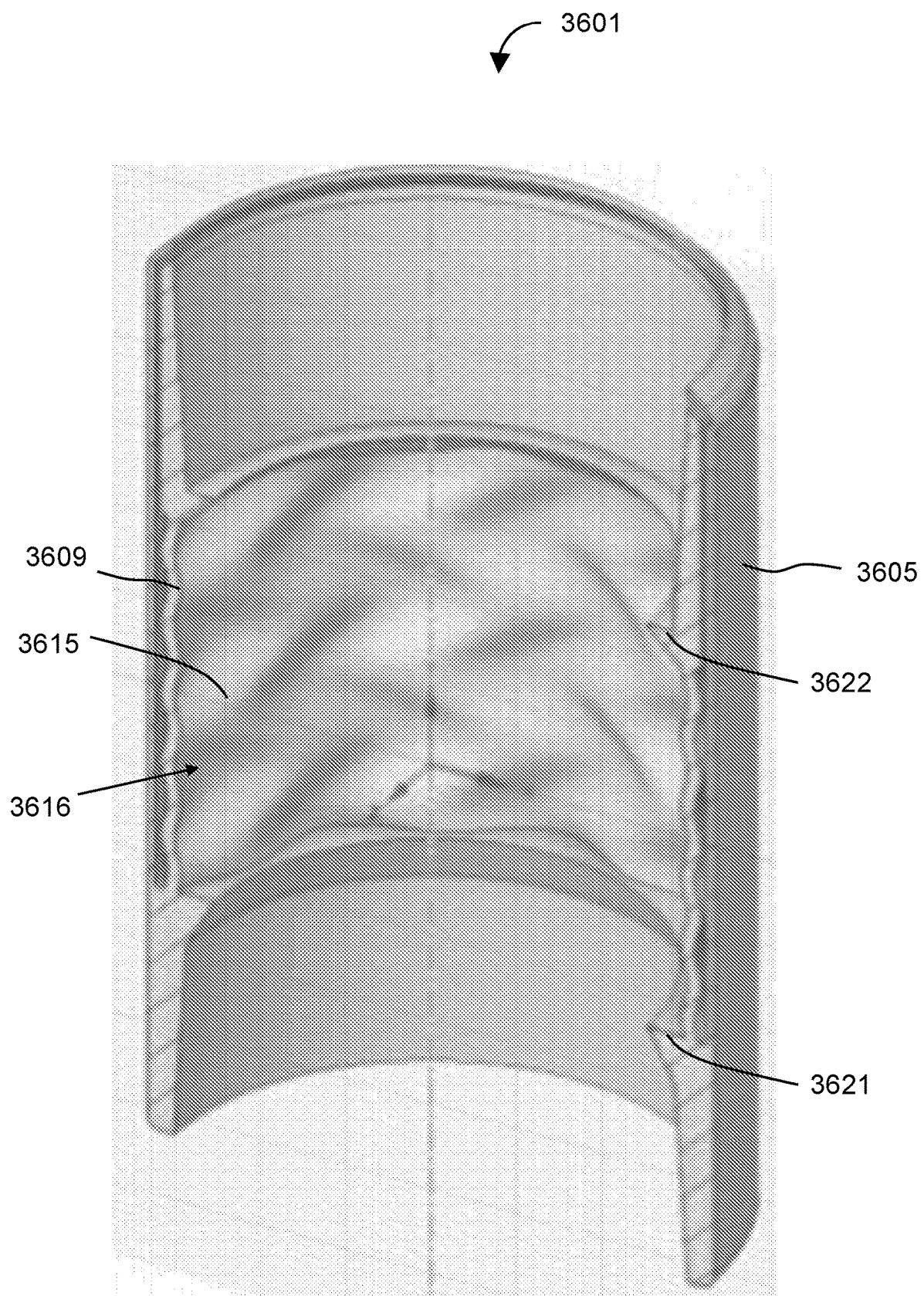
FIG. 36 shows a non-threaded embodiment of a casing connector.

FIG. 36 shows a non-threaded embodiment of a casing connector 3601. As shown, the connector 3601 has a body 3605 connected to one end of a bellows 3609. As shown, the bellows 3609 has at least two sets of non-parallel undulations 3615 that meet to define open cells 3616 along a surface of the bellows. The connector 3601 includes lower torque shoulder 3621 and upper torque shoulder 3622, each with a ramped face. Like all of the depicted connectors, the connector 3601 may have an upper mating face (e.g. on the bellows) and a lower mating face (immobile with respect to the body).

Figure 37:
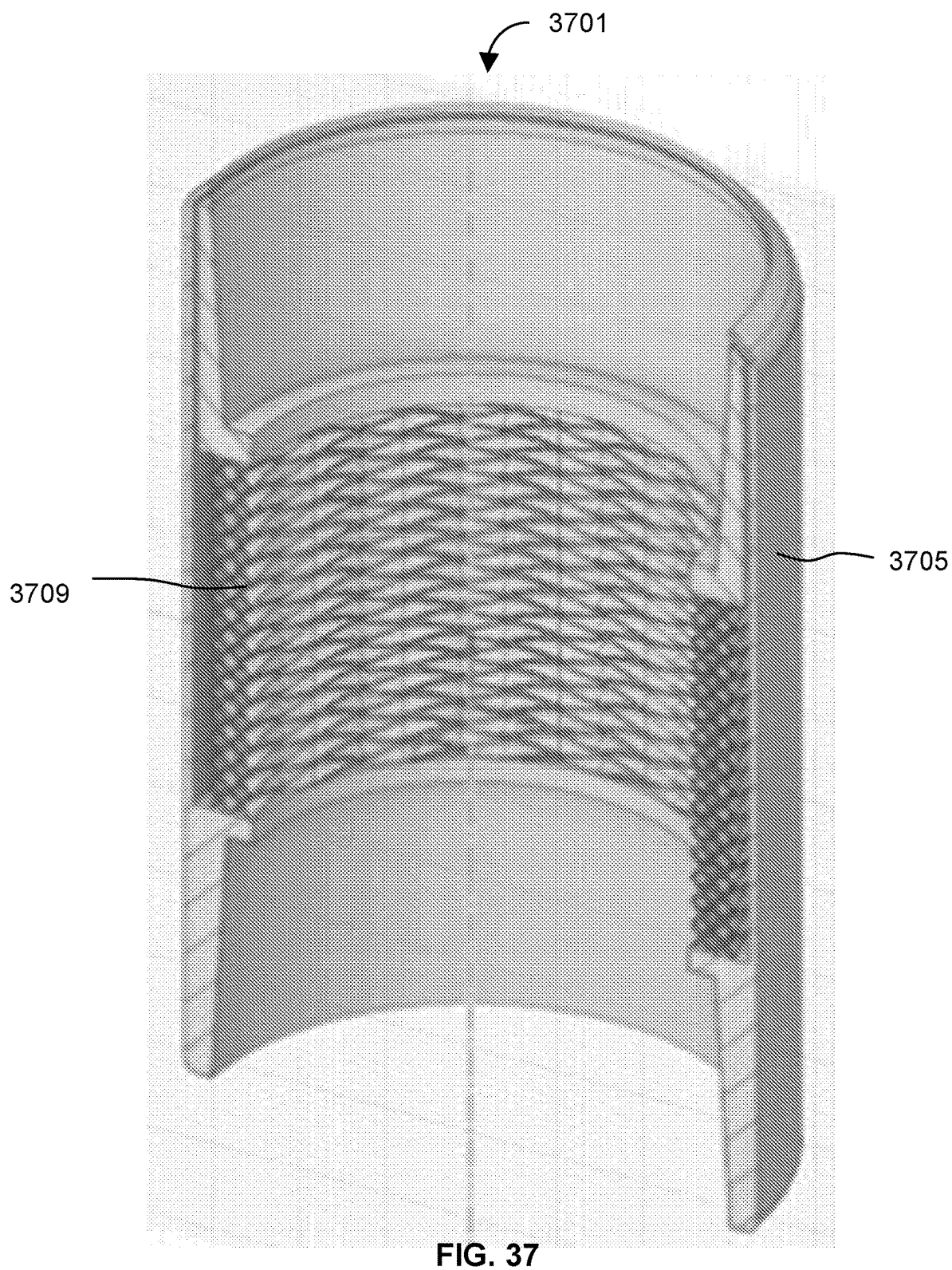
FIG. 37 shows a lattice-like embodiment of a casing connector.

FIG. 37 shows a lattice-like embodiment of a casing connector 3701. The connector 3701 includes a bellows 3709 connected to a body 3705 at one end. The bellows as two sets of non-parallel corrugations that define a plurality of open cells.

For the depicted casing connectors, due to the bellows, when pressure is applied axially, open cells of the bellows promote deformation of the connector axially to an extent greater than that of a connector made with a bulk monolithic structure and no open cells.

Figure 38:
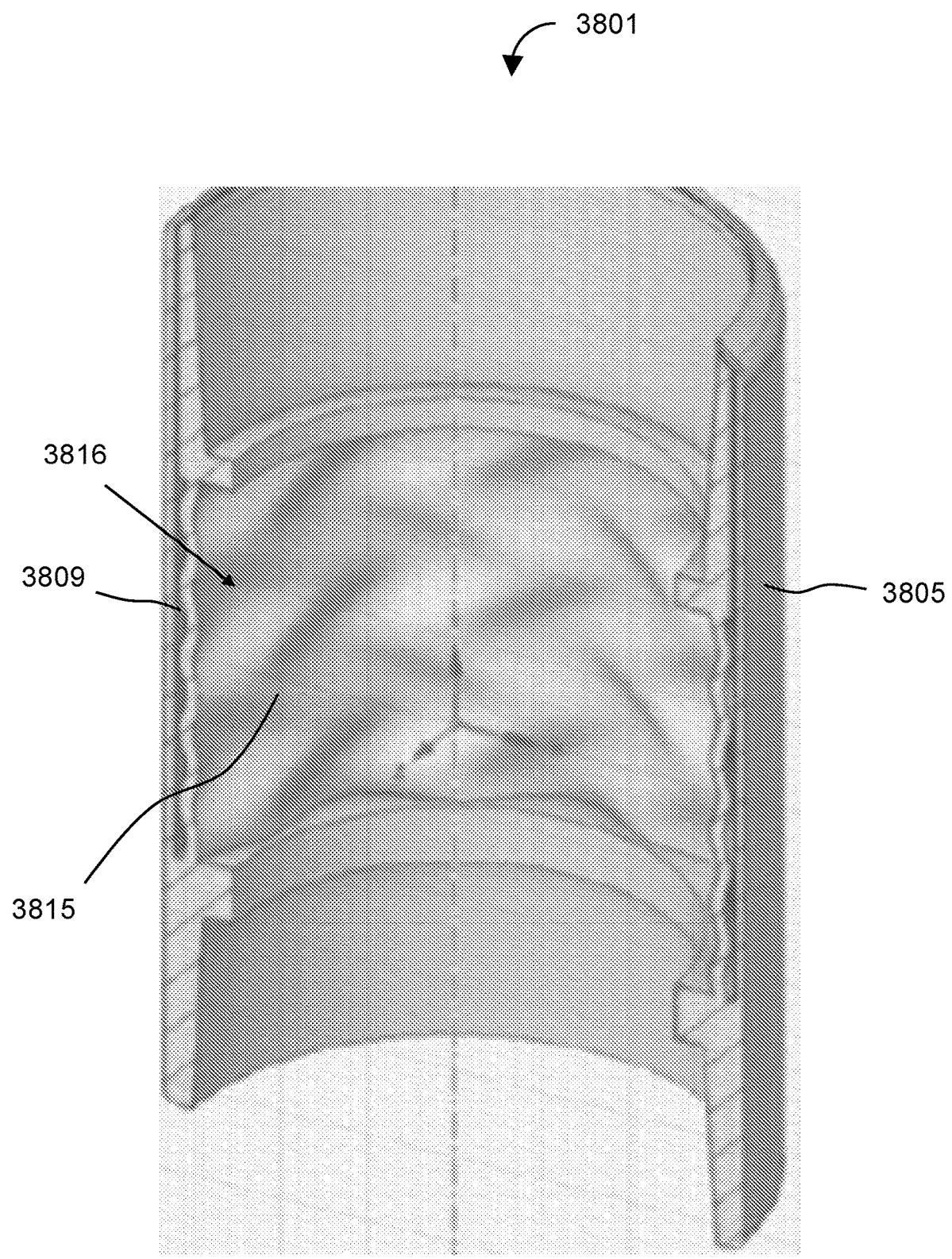
FIG. 38 shows a two shoulder embodiment of a casing connector.

FIG. 38 shows a two shoulder embodiment of a casing connector 3801. The connector 3801 includes a bellows 3809 connected to a body 3805 at one end. The bellows has two sets of non-parallel corrugations 3815 that define a plurality of open cells 3816. Due to the bellows 3809, when pressure is applied axially, the open cells 3816 of the bellows promote deformation of the connector 3801 axially to an extent greater than that of a connector made with a bulk monolithic structure and no open cells. It is within the scope of the disclosure that each and every feature of any disclosed connector may be combined with any other feature. For example, the invention provides a connector with one smooth mating face as shown in connector 3601 and one threaded mating face as shown in connector 3301. The invention provides connectors with zero or any number of torque shoulders, any of which may have a ramped face.

The depicted structures maybe used in making any component of a geothermal system including casings, casing connectors, packer assemblies, sealing elements, or others. Preferred components include a metamaterial structure characterized by a plurality of open cells. Any of the depicted connectors may be referred to a Geometrically Enhanced Metamaterial Flexible connector (GEM-Flex). GEM-Flex includes connectors that provide an expandable sealing element. Those connectors can connect casings within enhanced geothermal systems (EGS) drill holes and wells. The connectors may be integrated with existing packer assemblies, providing a high strength flexible coupling. Advantageously, GEM-Flex targets the critical failure mode of packer assemblies, enables high performance parts, and promotes cost-competitive increases in strength without disrupting the supply chain, reducing the risk of well abandonment.

Casing connectors of the disclosure may include flexible bellows that are composed of multiple corrugations that spread stress throughout the surface and enable axial expansion without sacrificing torsional or bending rigidity. For example, when fabricated from a high strength steel the axial extension before failure can accommodate high temperature operating conditions. Connectors may be made with blank surfaces that could be threaded or include fillets on the external body to minimize installation damage with large external pipe bodies. Moreover, the GEM-Flex design is parametrically controlled, allowing for changes in any single aspect of the design, for example casing size, the usage of external upset or non-upset casing, or the addition of functional geometry, for example, O-ring grooves or torque shoulders, to be adjusted without substantive change in the manufacturing process.

Common American Petroleum Institute (API) grade steels like J55, L80, or P110 lose strength at high temperatures, and the highest strength steels are not rated for the intense chemistry requirements. For example, steel typically has a coefficient of thermal expansion of $\approx 1.2$ m/m° C. Since the casing cannot freely expand, thermal expansion stress sets a maximum operating temperature based on the yield stress of the casing. For example, at 160° C. the API grade steel K55 yields without external loads or pressures, whereas the operating temperature is slightly higher for L80 with a maximum temperature of $\approx 230°$ C. As the temperature rises, the steel yields, and when the well cools the casing is left in a state of residual tension. The residual tension left in the casing after cool-down reduces resistance to collapse and burst when pressurized, and ultimately shrinks the operational range of the casing. Advantageously, GEM-Flex is capable of operating at temperatures of approximately 400° C.

A component of the disclosure may be fabricated from an alloy that not only meets the material characteristics of existing wrought or cast steel but may also provide strength enhancements. For example, a casing connector may be formed from an additively manufactured material, for example an additively manufactured metal. Any known techniques for creating additively manufactured metal may be used such as blown powder direct energy deposition, sintered fused deposition modeling, wire arc additive manufacturing, and powder bed fusion. These materials may be tested post-manufacturing to ensure that they exhibit required mechanical characteristics.

Advantageously, the material for forming GEM-Flex displays geometric complexity and high feature resolution, within an envelope that is relatively small (for example, less than a cubic foot/.02 cubic meters). An exemplary material may be formed from powder bed fusion. Powder bed fusion functions by depositing a layer of atomized metallic powder on a build plate, and then using a laser to locally melt the powder according to the design. This process has several advantageous. First, the layer-by-layer build process produces a part that is essentially isotropic, in contrast to other layer-building methods. Second, the non-equilibrium process that occurs when the laser melts and reforms the metal allows careful alloy development and control. Third, graded steels, for example corrosion resistant SS316L alloys and high strength G300 maraging steel, may be used with powder bed fusion process. However, any manufacturing method that preserves the isotropic, ductile, high strength characteristics of the base alloy may be used with the sealing elements of the invention.

The durability and stress response of the casing components was tested to characterize and optimize the mechanical response, temperature dependence, and machinability of casing connectors. Because the mechanical response is based on replacing the cylindrical part of typical casing connector with a complex surface, the response of the overall component is dependent on various geometric parameters (for example, the shape of the corrugations, the thickness of the material, and the orientation of the corrugations) as well as the constitutive behavior of the material itself. Rapid mechanical testing was performed on small mechanical coupons.

Those tests validated the overall mechanical performance of the additively manufactured steel components shown herein. For example, those tests demonstrate that the materials geometries in the casing connectors shown here when produced from ss3161 made those casing connectors essentially isotropic. The mechanical parts behaved as predicted by simulation, with an initial stiff response followed by a large axial strain at constant stress. This enables large expansion behavior that will ultimately be used in the production part to mitigate thermal expansion. Tests that were performed also validated that additively manufactured threads may be fabricated to API or proprietary specifications and operate properly in real-world conditions without post-processing.

The tests revealed that the structure in casing connector 3301 operates to all intended specifications over a range of size scales (e.g., may be scaled up or down in size and perform, i.e., outer diameter on the order of four to ten inches). Those tests also indicate that flexibility of the part is more than capable of accommodating the strain for thermal expansion. For a fully cemented well operating at between 200° C. and 400° C., tests and models predict that the casing strain from thermal expansion is between 0.26% and 0.52%, whereas the depicted casing connectors can accommodate up to 5% axial strain before yield, and between 10-15% until failure, dramatically improving the high-temperature resilience of a well.

References and citations to other documents, such as patents, patent applications, patent publications, journals, books, papers, web contents, have been made throughout this disclosure. All such documents are hereby incorporated herein by reference in their entirety for all purposes.

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof

What is claimed is:

1. A casing connector for a geothermal well, the connector comprising:
    a hollow cylindrical body with upper and lower ends; and
    a bellows disposed within the body, wherein the bellows comprises a form defined by at least two sets of intersecting or interfering corrugations.

2. The connector of claim 1, wherein an upper end of the bellows has an upper mating face for coupling to a first casing, and a lower end of the bellows is connected to the lower end of the body, where the lower end of the body includes a lower mating face.

3. The connector of claim 1, wherein an external surface of the body is substantially smooth and cylindrical.

4. The connector of claim 1, wherein the bellows is connected to the body at the lower end.

5. The connector of claim 1, wherein the bellows and the body are of one monolithic piece of material.

6. The connector of claim 1, wherein the connector is made by a powder bed fusion (PDF) process.

7. The connector of claim 1, wherein the connector is made from steel.

8. The connecter of claim 1 formed of stainless steel 316L or g300 maraging steel by additive manufacturing.

9. The connector of claim 1, further comprising at least one torque shoulder, wherein at least one face of the torque shoulder is ramped and does not present an overhang during additive manufacturing.

10. The connector of claim 1, wherein either or both ends comprise additively manufactured threads.

11. The connector of claim 1, wherein a mass of the connector is less than about 4.2 kg.

12. The connector of claim 1, wherein the bellows comprises additively manufactured steel in a multi-corrugated form, and the connector can accommodate up to 5% axial strain before yield and greater than 10% axial strain before failure.

13. The connector of claim 1, wherein the upper and lower ends have a feature selected from a group consisting of a short thread casing coupling, a long thread casing coupling, and a buttress thread casing coupling.

14. The connector of claim 1, wherein the connector is made of a high strength corrosion-resistant metallic alloy.

15. The connector of claim 1, wherein the bellows is compressible within the body.

16. The connector of claim 1, wherein the bellows is configured to accommodate up to 5% axial strain before yield and greater than 10% axial strain before failure.

17. The connector of claim 1, wherein the body has a cylindrical external surface and a lower mating face configured to couple to a first casing at the lower end of the body, and wherein the bellows depends from the lower end and has an upper mating face configured to couple to a second casing.

18. The connector of claim 17, wherein the bellows comprises a metamaterial structure.

19. The connector of claim 17, wherein the body and the bellows are a monolithic structure made of a material selected from a group consisting of steel, metallic alloy, maraging steel g300, 316L stainless steel, thermoplastic polymers, and polyether ether ketone (PEEK).

20. The connector of claim 17, wherein the upper mating face and the lower mating face have a feature selected from a group consisting of a short thread casing coupling, a long thread casing coupling, a buttress thread casing coupling, and a blank casing coupling surface.

21. A casing connector for a geothermal well, the connector comprising:
    a hollow cylindrical body with upper and lower ends; and
    a bellows disposed within the body, wherein the bellows comprises an undulating surface defined by intersections or interferences among two or more sets of corrugations.

22. A casing connector for a geothermal well, the connector comprising:
    a hollow cylindrical body with upper and lower ends; and
    a bellows disposed within the body, wherein the bellows has at least two sets of non-parallel undulations that meet or cooperate to define open cells along a surface of the bellows.

23. A casing connector for a geothermal well, the connector comprising:
    a hollow cylindrical body with upper and lower ends; and
    a bellows disposed within the body, wherein when pressure is applied axially to the connector, open cells along a surface of the bellows promote deformation of the connector axially to an extent greater than that of a connector made with a bulk monolithic structure and no open cells.

* * * * *